United States Patent

Takeuchi et al.

Patent Number: 5,889,163
Date of Patent: Mar. 30, 1999

[54] METHOD FOR PRODUCING AZO DYE COMPOUNDS

[75] Inventors: Kiyoshi Takeuchi; Koki Nakamura, both of Minami-ashigara, Japan

[73] Assignee: Fuji Photo Film Co., Ltd., Kanagawa-ken, Japan

[21] Appl. No.: 756,913

[22] Filed: Nov. 26, 1996

[30] Foreign Application Priority Data

Nov. 30, 1995 [JP] Japan ................................ 7-334203

[51] Int. Cl.⁶ .................................................. C09B 41/00
[52] U.S. Cl. ............................................ 534/586; 430/380
[58] Field of Search ............................... 534/586; 430/380

[56] References Cited

U.S. PATENT DOCUMENTS

| | | | |
|---|---|---|---|
| 2,424,256 | 7/1947 | Schmidt et al. | 430/380 |
| 3,285,957 | 11/1966 | Baker et al. | 564/34 |
| 3,342,597 | 9/1967 | Harnish et al. | 430/376 |
| 3,719,492 | 3/1973 | Barr et al. | 430/376 |
| 3,782,949 | 1/1974 | Olivares et al. | 430/218 |
| 4,060,418 | 11/1977 | Waxman et al. | 430/212 |
| 4,481,268 | 11/1984 | Bailey et al. | 430/17 |
| 4,684,604 | 8/1987 | Harder | 430/375 |
| 4,740,453 | 4/1988 | Nakamura et al. | 430/505 |
| 4,978,602 | 12/1990 | Fujita et al. | 430/264 |
| 5,030,546 | 7/1991 | Takamuki et al. | 430/264 |
| 5,147,764 | 9/1992 | Bowne | 430/380 X |
| 5,230,983 | 7/1993 | Inoue et al. | 430/264 |
| 5,262,274 | 11/1993 | Katoh | 430/264 |
| 5,273,859 | 12/1993 | Katoh et al. | 430/264 |
| 5,278,025 | 1/1994 | Okamura et al. | 430/264 |
| 5,279,920 | 1/1994 | Onodera et al. | 430/264 |
| 5,286,598 | 2/1994 | Inoue et al. | 430/264 |
| 5,385,816 | 1/1995 | Stanley et al. | 430/380 X |
| 5,415,981 | 5/1995 | Clarke et al. | 430/384 |
| 5,416,218 | 5/1995 | Chan et al. | 548/338.1 |
| 5,424,170 | 6/1995 | Sudo et al. | 430/264 |
| 5,441,847 | 8/1995 | Fukawa et al. | 430/264 |
| 5,447,835 | 9/1995 | Sakai et al. | 430/598 |
| 5,629,140 | 5/1997 | Harder et al. | 430/489 |
| 5,695,913 | 12/1997 | Nakamura et al. | 430/373 |

FOREIGN PATENT DOCUMENTS

| | | |
|---|---|---|
| 0545491 | 6/1993 | European Pat. Off. |
| 0565165 | 10/1993 | European Pat. Off. |
| 593110 | 4/1994 | European Pat. Off. |
| 1159758 | 12/1963 | Germany . |
| 57-76543 | 5/1982 | Japan . |
| 58-14671 | 3/1983 | Japan . |
| 58-14672 | 3/1983 | Japan . |
| 59-81643 | 5/1984 | Japan . |
| 1201650 | 8/1989 | Japan . |
| 7325358 | 12/1995 | Japan . |
| 803783 | 10/1958 | United Kingdom . |
| 1069061 | 5/1967 | United Kingdom . |

OTHER PUBLICATIONS

Chemische Berichte, vol. 54, 1921, Weinheim DE, pp. 660–669, XP002003472, W. Borsche: "Uber Cyan–nitrophenylhydrazine" pp. 662, 665.

Database Crossfire, Beilstein Informationssysteme GmbH, Frankfurt DE, BERN=3446337, XP002003474.

Journal of the Chemical Society, Hegarty et al., Hydrolysis of Azoesters . . . , 1980, pp. 1238–1243.

*Primary Examiner*—Fiona T. Powers
*Attorney, Agent, or Firm*—Birch, Stewart, Kolasch & Birch, LLP

[57] ABSTRACT

There is disclosed a method for producing azo dye compounds, which comprises reacting a compound represented by formula (I) or (II) with a coupling component, in the presence of an oxidizing agent.

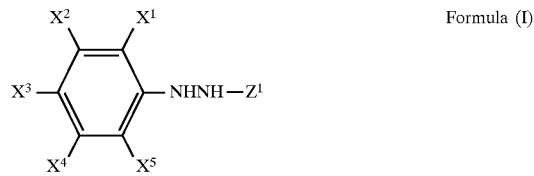

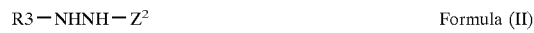

wherein $Z^1$ and $Z^2$ each represent an acyl group, a carbamoyl group, an alkoxycarbonyl group, or an aryloxycarbonyl group; $X^1$, $X^2$, $X^3$, $X^4$, and $X^5$, each represent a hydrogen atom or a substituent, provided that the sum of the Hammett substituent constant $\sigma p$ values of $X^1$, $X^3$, and $X^5$ and the Hammett substituent constant $\sigma m$ values of $X^2$ and $X^4$ is 0.80 or more but 3.80 or below; and $R^3$ represents a heterocyclic group. According to the above method, azo dye compounds can be produced in a high yield by the use of hydrazines or azo compounds, both of which are safe raw materials, rather than a diazonium salt compound that involves a risk of explosion.

16 Claims, No Drawings

METHOD FOR PRODUCING AZO DYE COMPOUNDS

FIELD OF THE INVENTION

The present invention relates to a method for producing azo dye compounds that are useful for photographic coloring matters, dyestuffs (dyes), and the like.

BACKGROUND OF THE INVENTION

With respect to producing an azo compound, various methods have long been known, including those by means of oxidation reaction, reduction reaction, substitution reaction, addition reaction, or condensation reaction, and other methods, as described in *Shin-jikken Kagaku Koza* (Maruzen Co. Ltd.), Vol. 14-III, pp. 1516 to 1534. However, most of the methods that have been employed as industrial preparation methods of azo dye compounds are processes whereby a diazonium salt and a coupling component, such as anilines and phenols, are subjected to an azo coupling reaction, from such points of view as availability of raw materials, cost, and yield. Such methods have the drawbacks that the diazonium salt is at risk of exploding, and further the yield is low in accordance with some kinds of diazonium salts and coupling components. Specifically, it is difficult to prepare a diazonium salt having bonded thereto an electron-attracting group, and eventually the production of such a compound necessitates a reaction under a strongly acidic condition. Consequently, when a diazonium compound has a functional group that is unstable under an acidic condition, the above-mentioned reaction cannot be applied to the compound, so the use of such a method is greatly restricted. In particular, among these diazonium salts, many heterocyclic diazonium salts are unstable, and therefore a widely applicable method for the production of a diazonium compound is not yet known. Further, with respect to a coupling component, it is known in a diazo-coupling method that, when the coupling position is unsubstituted, or is substituted with a special substituent, such as a formyl group and a carboxyl group, a coupling reaction proceeds efficiently, whereas when the coupling position is substituted with a substituent, such as a halogen atom (e.g. a fluorine atom, a chlorine atom, a bromine atom), an aryloxy group, and an acyloxy group, almost no dye is formed.

Further, an alternative method, whereby an azo dye compound is prepared by reacting a sulfonylhydrazine compound with a coupling component in a photographic light-sensitive material, is described in, for example, European Patent Nos. 545491A1 and 565165A1. However, according to this method, only when the coupling position of a coupling component is unsubstituted, or is substituted with a special substituent, such as a formyl group or a carboxyl group, in the same manner as a diazonium salt, does a reaction proceed efficiently. Furthermore, the yield of this method is also low.

SUMMARY OF THE INVENTION

As described above, former preparation methods involved problems, such as a poor availability of raw materials, high risk of explosion, restriction of applicable range (methods or compounds), and low yield.

An object of the present invention is to overcome the above-described problems, and more specifically the object is to provide a method for producing azo dye (dyestuff) compounds, whereby the compounds can be manufactured in safety, under a moderate reaction condition, and in a high yield from raw materials that are easily available or can be synthesized with ease.

Other and further objects, features, and advantages of the invention will appear more fully from the following description.

DETAILED DESCRIPTION OF THE INVENTION

The above-mentioned object of the present invention has been accomplished by the following method.

(1) A method for producing azo dye compounds, which comprises reacting a compound represented by formula (I) or (II) with a coupling component, in the presence of an oxidizing agent.

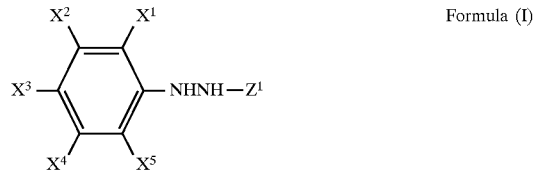

Formula (I)

Formula (II)

wherein $Z^1$ represents an acyl group, a carbamoyl group, an alkoxycarbonyl group, or an aryloxycarbonyl group; $Z^2$ represents an acyl group, a carbamoyl group, an alkoxycarbonyl group, or an aryloxycarbonyl group; $X^1$, $X^2$, $X^3$, $X^4$, and $X^5$, each represent a hydrogen atom or a substituent, provided that the sum of the Hammett substituent constant σp values of $X^1$, $X^3$, and $X^5$ and the Hammett substituent constant σm values of $X^2$ and $X^4$ is 0.80 or more but 3.80 or below; and $R^3$ represents a heterocyclic group.

(2) A method for producing azo dye compounds, which comprises reacting a compound represented by formula (V) or (VI) with a coupling component.

Formula (V):

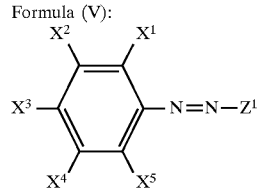

Formula (VI):
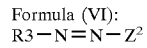

wherein $Z^1$ represents an acyl group, a carbamoyl group, an alkoxycarbonyl group, or an aryloxycarbonyl group; $Z^2$ represents an acyl group, a carbamoyl group, an alkoxycarbonyl group, or an aryloxycarbonyl group; $X^1$, $X^2$, $X^3$, $X^4$, and $X^5$, each represent a hydrogen atom or a substituent, provided that the sum of the Hammett substituent constant σp values of $X^1$, $X^3$, and $X^5$ and the Hammett substituent constant σm values of $X^2$ and $X^4$ is 0.80 or more but 3.80 or below; and $R^3$ represents a heterocyclic group.

The compound represented by formula (I) or (II), is preferably represented by formula (III) or (IV), respectively:

Formula (III):

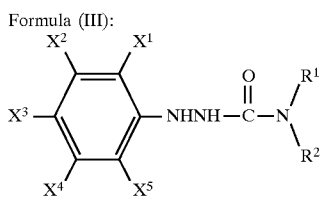

Formula (IV):

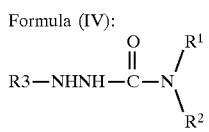

wherein $R^1$ and $R^2$ each represent a hydrogen atom or a substituent; $X^1$, $X^2$, $X^3$, $X^4$, and $X^5$, each represent a hydrogen atom or a substituent, provided that the sum of the Hammett substituent constant σp values of $X^1$, $X^3$, and $X^5$ and the Hammett substituent constant σm values of $X^2$ and $X^4$ is 0.80 or more but 3.80 or below; and $R^3$ represents a heterocyclic group.

The compound represented by formula (V) or (VI), is preferably represented by formula (VII) or (VIII), respectively:

Formula (VII):

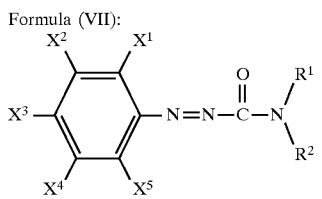

Formula (VIII):

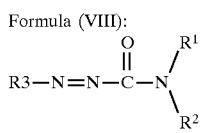

wherein $R^1$ and $R^2$ each represent a hydrogen atom or a substituent; and $X^1$, $X^2$, $X^3$, $X^4$, and $X^5$, each represent a hydrogen atom or a substituent, provided that the sum of the Hammett substituent constant σp values of $X^1$, $X^3$, and $X^5$ and the Hammett substituent constant σm values of $X^2$ and $X^4$ is 0.80 or more but 3.80 or below; and $R^3$ represents a heterocyclic group.

DESCRIPTION OF THE PREFERRED EMBODIMENTS

The compounds represented by formulae (I) to (VIII) used in the present invention are described below in detail.

In formulae (I), (II), (V) and (VI), $Z^1$ represents an acyl group, a carbamoyl group, an alkoxycarbonyl group, or an aryloxycarbonyl group, and $Z^2$ represents an acyl group, a carbamoyl group, an alkoxycarbonyl group, or an aryloxycarbonyl group. The acyl group preferably has 1 to 50 carbon atoms, and more preferably 2 to 40 carbon atoms. Specific examples include an acetyl group, a 2-methylpropanoyl group, a cyclohexylcarbonyl group, an n-octanoyl group, a 2-hexyldecanoyl group, a dodecanoyl group, a chloroacetyl group, a trifluoroacetyl group, a benzoyl group, a 4-dodecyloxybenzoyl group, a 2-hydroxymethylbenzoyl group, and a 3-(N-hydroxy-N-methylaminocarbonyl)propanoyl group.

With respect to the case wherein $Z^1$ and $Z^2$ each represent a carbamoyl group, a description is made in detail in formulas (III), (IV), (VII) and (VIII).

Preferably the alkoxycarbonyl group and the aryloxycarbonyl group have 2 to 50 carbon atoms, and more preferably 2 to 40 carbon atoms. Specific examples include a methoxycarbonyl group, an ethoxycarbonyl group, an isobutyloxycarbonyl group, a cyclohexyloxycarbonyl group, a dodecyloxycarbonyl group, a benzyloxycarbonyl group, a phenoxycarbonyl group, a 4-octyloxyphenoxycarbonyl group, a 2-hydroxymethylphenoxycarbonyl group, and a 2-dodecyloxyphenoxycarbonyl group.

$X^1$, $X^2$, $X^3$, $X^4$, and $X^5$ each represent a hydrogen atom or a substituent. Examples of the substituent include a straight-chain alkyl group, a branched-chain alkyl group, or a cycloalkyl group, having 1 to 50 carbon atoms (e.g. trifluoromethyl, methyl, ethyl, propyl, heptafluoropropyl, isopropyl, butyl, t-butyl, t-pentyl, cyclopentyl, cyclohexyl, octyl, 2-ethylhexyl, and dodecyl); a straight-chain alkenyl group, a branched-chain alkenyl group, or a cycloalkenyl group, having 2 to 50 carbon atoms (e.g. vinyl, 1-methylvinyl, and cyclohexen-1-yl); an alkynyl group having 2 to 50 carbon atoms in all (e.g. ethynyl and 1-propinyl), an aryl group having 6 to 50 carbon atoms (e.g. phenyl, naphthyl, and anthryl), an acyloxy group having 1 to 50 carbon atoms (e.g. acetoxy, tetradecanoyl, and benzoyloxy), a carbamoyloxy group having 1 to 50 carbon atoms (e.g. N,N-dimethylcarbamoyloxy), a carbonamido group having 1 to 50 carbon atoms (e.g. formamido, N-methylacetamido, acetamido, N-methylformamido, and benzamido), a sulfonamido group having 1 to 50 carbon atoms (e.g. methanesulfonamido, dodecansulfonamido, benzenesulfonamido, and p-toluenesulfonamido), a carbamoyl group having 1 to 50 carbon atoms (e.g. N-methylcarbamoyl, N,N-diethylcarbamoyl, and N-mesylcarbamoyl), a sulfamoyl group having 0 to 50 carbon atoms (e.g. N-butylsulfamoyl, N,N-diethylsulfamoyl, and N-methyl-N-(4-methoxyphenyl)sulfamoyl), an alkoxy group having 1 to 50 carbon atoms (e.g. methoxy, propoxy, isopropoxy, octyloxy, t-octyloxy, dodecyloxy, and 2-(2,4-di-t-pentylphenoxy)ethoxy), an aryloxy group having 6 to 50 carbon atoms (e.g. phenoxy, 4-methoxyphenoxy, and naphthoxy), an aryloxycarbonyl group having 7 to 50 carbon atoms (e.g. phenoxycarbonyl and naphthoxycarbonyl), an alkoxycarbonyl group having 2 to 50 carbon atoms (e.g. methoxycarbonyl and t-butoxycarbonyl), an N-acylsulfamoyl group having 1 to 50 carbon atoms (e.g. N-tetradecanoylsulfamoyl and N-benzoylsulfamoyl), an alkylsulfonyl group having 1 to 50 carbon atoms (e.g. methanesulfonyl, octylsulfonyl, 2-methoxyethylsulfonyl, and 2-hexyldecylsulfonyl), an arylsulfonyl group having 6 to 50 carbon atoms (e.g. benzenesulfonyl, p-toluenesulfonyl, and 4-phenylsulfonylphenylsulfonyl), an alkoxycarbonylamino group having 2 to 50 carbon atoms (e.g. ethoxycarbonylamino), an aryloxycarbonylamino group having 7 to 50 carbon atoms (e.g. phenoxycarbonylamino and naphthoxycarbonylamino), an amino group having 0 to 50 carbon atoms (e.g. amino, methylamino, diethylamino, diisopropylamino, anilino, and morpholino), a cyano group, a nitro group, a carboxyl group, a hydroxy group, a sulfo group, a mercapto group, an alkylsulfinyl group having 1 to 50 carbon atoms (e.g. methanesulfinyl and octanesulfinyl), an arylsulfinyl having 6 to 50 carbon atoms (e.g. benzenesulfinyl, 4-chlorophenylsulfinyl, and p-toluenesulfinyl), an alkylthio group having 1 to 50 carbon atoms (e.g. methylthio, octylthio, and cyclohexylthio), an arylthio group having 6 to 50 carbon atoms (e.g. phenylthio and naphthylthio), a ureido group having 1 to 50 carbon atoms (e.g. 3-methylureido, 3,3-dimethylureido, and 1,3- diphenylureido), a heterocyclic group having 2 to 50 carbon atoms (e.g. a 3-membered to 12-membered monocyclic ring or condensed ring having at least one hetero atom(s), such as nitrogen, oxygen, and sulfur, for example, 2-furyl, 2-pyranyl, 2-pyridyl, 2-thienyl, 2-imidazolyl, morpholino, 2-quinolyl, 2-benzimidazolyl, 2-benzothiazolyl, and 2-benzoxazolyl), an acyl group having 1 to 50 carbon atoms (e.g. acetyl, benzoyl, and trifluoroacetyl), a sulfamoylamino group having 0 to 50 carbon atoms (e.g. N-butylsulfamoylamino and N-phenylsulfamoylamino), a silyl group having 3 to 50 carbon atoms (e.g. trimethylsilyl, dimethyl-t-butylsilyl, and triphenylsilyl), and a halogen atom (e.g. a fluorine atom, a chlorine atom, and a bromine atom). The above substituents may have a substituent, and examples of such a substituent include those mentioned above. Further, $X^1$, $X^2$, $X^3$, $X^4$, and $X^5$ may bond together to form a condensed ring.

The number of carbon atoms of the substituent is preferably 50 or below, more preferably 42 or below, and most preferably 34 or below, and there is preferably 1 or more carbon atom(s).

With respect to $X^1$, $X^2$, $X^3$, $X^4$, and $X^5$ in formulae (I), (III), (V), and (VII), the sum of the Hammett substituent constant σp values of $X^1$, $X^3$, and $X^5$ and the Hammett substituent constant σm values of $X^2$ and $X^4$ is generally 0.80 or more but 3.80 or below. In formulae (I), (III), (V), and (VII), the sum of the Hammett substituent constant σp values of $X^1$, $X^3$, and $X^5$ and the Hammett substituent constant σm values of $X^2$ and $X^4$ is preferably 1.20 or more but 3.80 or below, more preferably 1.50 or more but 3.80 or below, and most preferably 1.70 or more but 3.80 or below.

Herein, if the sum of the σp values and the σm values is less than 0.80, the problem arises that the reactivity is unsatisfactory, while if the sum of the σp values and the σm values is over 3.80, the synthesis and availability of the compounds themselves become difficult.

Parenthetically, Hammett substituent constants σp and σm are described in detail in such books as "Hammett no Hosoku/Kozo to Hannousei," written by Naoki Inamoto (Maruzen); "Shin-jikken Kagaku-koza 14/Yukikagoubutsu no Gosei to Hanno V," page 2605 (edited by Nihonkagakukai, Maruzen); "Riron Yukikagaku Kaisetsu," written by Tadao Nakaya, page 217 (Tokyo Kagakudojin); and "Chemical Review" (Vol. 91), pages 165 to 195 (1991).

$R^1$ and $R^2$ in formulae (III), (IV), (VII), and (VIII), each represent a hydrogen atom or a substituent, and examples of the substituent are the same as those described for $X^1$, $X^2$, $X^3$, $X^4$, and $X^5$; preferably each represents a hydrogen atom, a substituted or unsubstituted alkyl group having 1 to 50 carbon atoms, a substituted or unsubstituted aryl group having 6 to 50 carbon atoms, or a substituted or unsubstituted heterocyclic group having 1 to 50 carbon atoms, and more preferably an alkyl group having 1 to 50 carbon atoms. The above alkyl group, aryl group, and heterocyclic group may have a substituent, and examples of the substituent include those mentioned above as the substituent on the ring. Further, preferably at least one of $R^1$ and $R^2$ is a hydrogen atom.

In formulae (II), (IV), (VI), and (VIII), $R^3$ represents a heterocyclic group. Herein, a preferable heterocyclic group has 1 to 50 carbon atoms, and the heterocyclic group contains at least one hetero atom, such as a nitrogen atom, an oxygen atom, and a sulfur atom, and further the heterocyclic group is a saturated or unsaturated 3-membered to 12-membered (preferably 3-membered to 8-membered) monocyclic or condensed ring. Specific examples of the heterocyclic ring are furan, pyran, pyridine, thiophene, imidazole, quinoline, benzimidazole, benzothiazole, benzoxazole, pyrimidine, pyrazine, 1,2,4-thiadiazole, pyrrole, oxazole, thiazole, quinazoline, isothiazole, pyridazine, indole, pyrazole, triazole, and quinoxaline. These heterocyclic groups may have a substituent, and preferably they have one or more electron-attracting groups. Herein, the term "an electron-attracting group" means one wherein the Hammett σp value is a positive value.

Now, the compound represented by formula (I), (II), (III), or (IV) used in the present invention is described specifically, but the scope of the present invention is not limited to them.

Further, examples of compounds represented by formula (V), (VI), (VII), or (VIII) include the oxidation products of the following compounds represented by formula (I), (II), (III), or (IV), i.e. compounds that each have a —N═N— group in place of the —NHNH— group of the latter compounds.

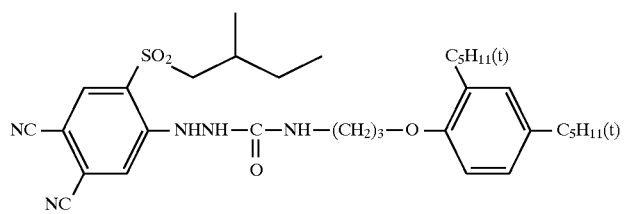

(1)

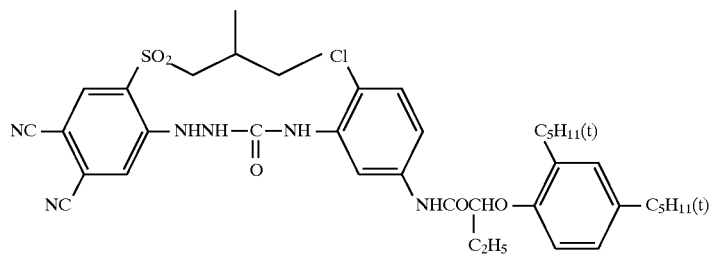

(2)

-continued
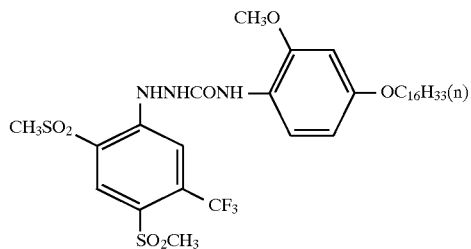
(3)
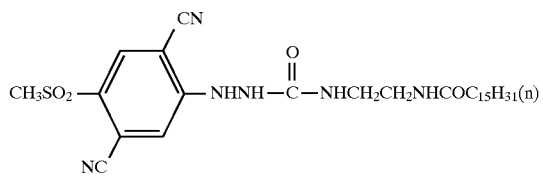
(4)
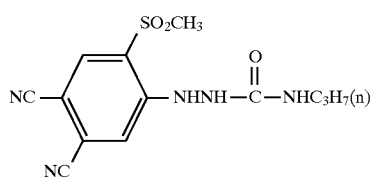
(5)
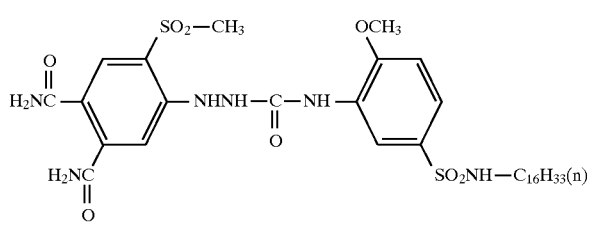
(6)
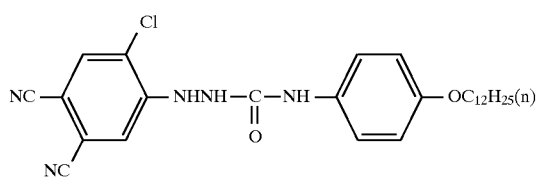
(7)
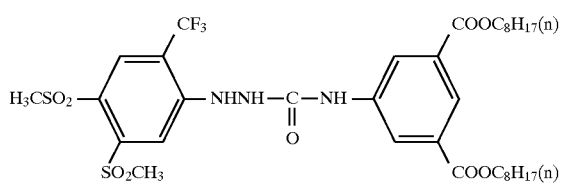
(8)
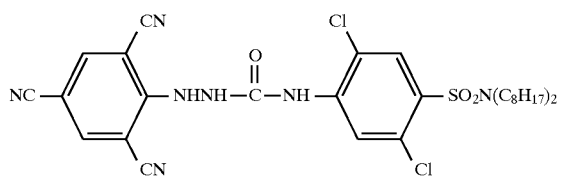
(9)
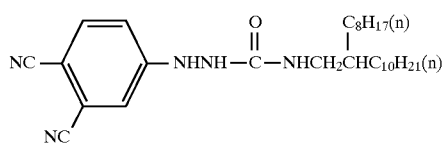
(10)

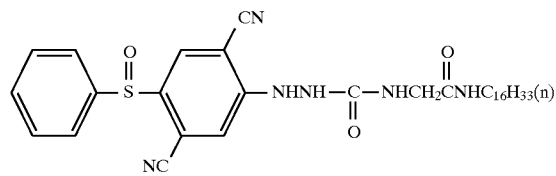
(11)
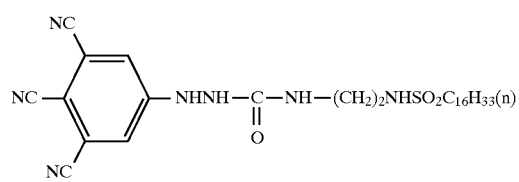
(12)
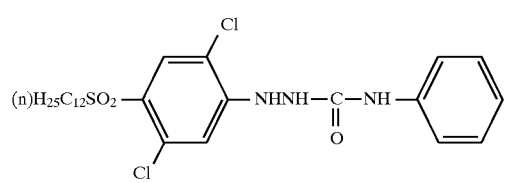
(13)
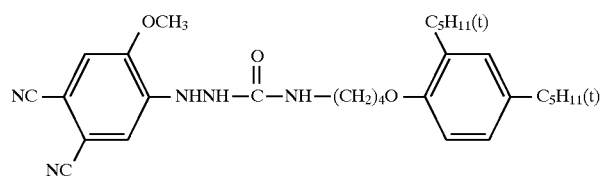
(14)
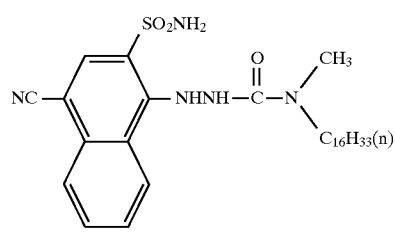
(15)
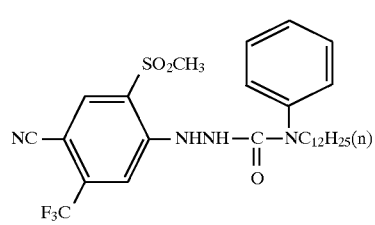
(16)
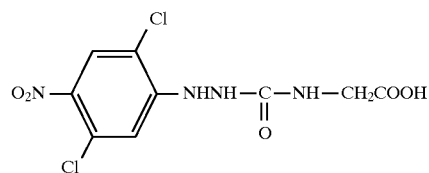
(17)
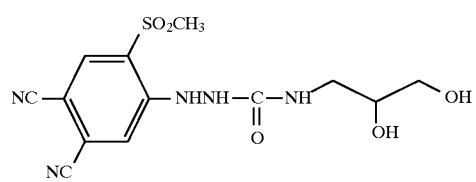
(18)

-continued
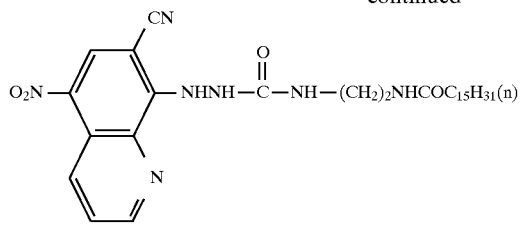
(19)
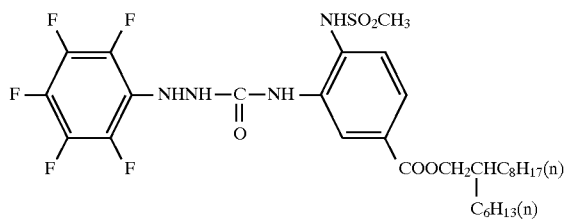
(20)
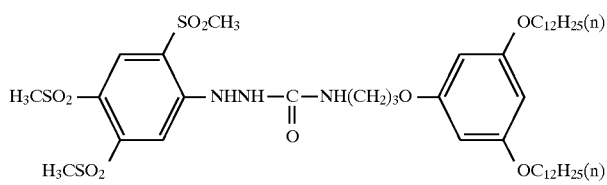
(21)
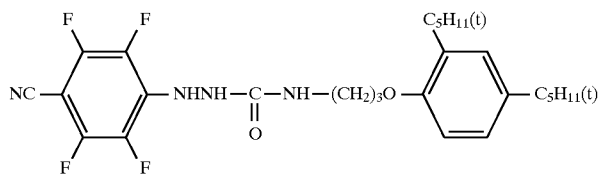
(22)
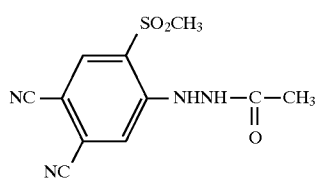
(23)
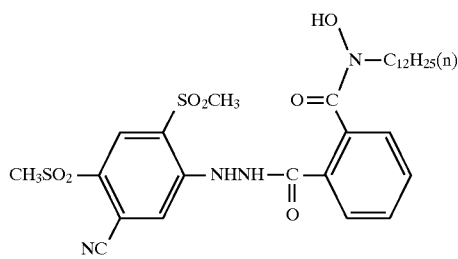
(24)
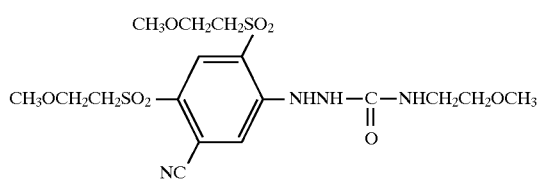
(25)
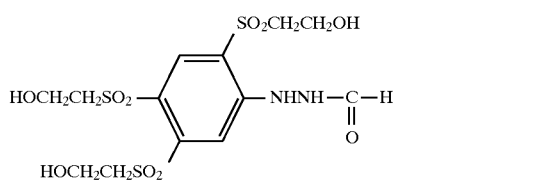
(26)

-continued
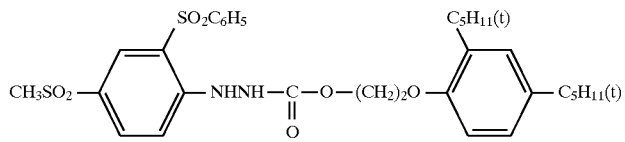
(27)
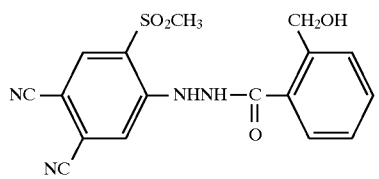
(28)
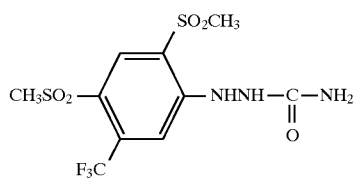
(29)
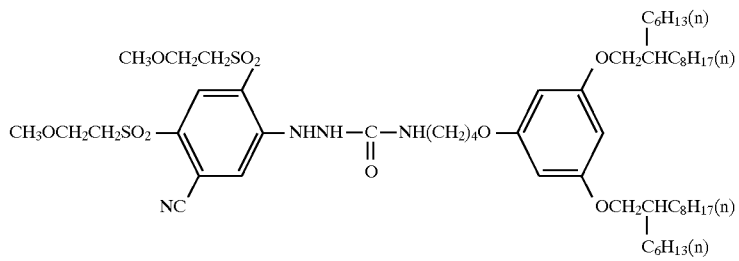
(30)
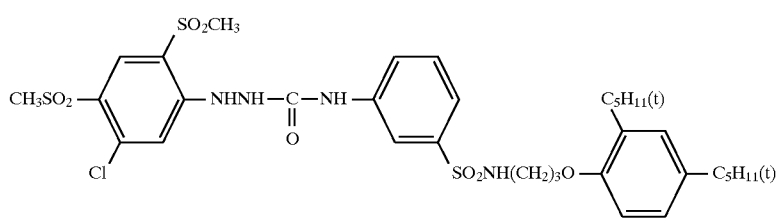
(31)
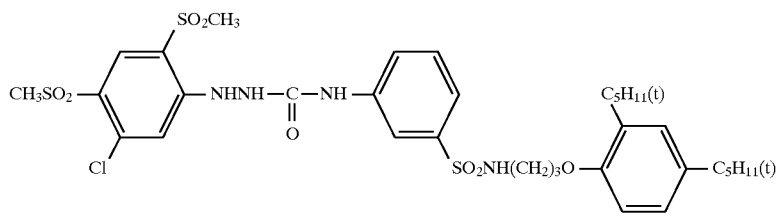
(32)
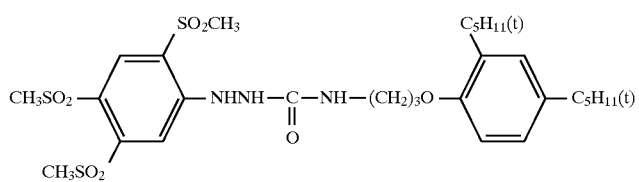
(33)
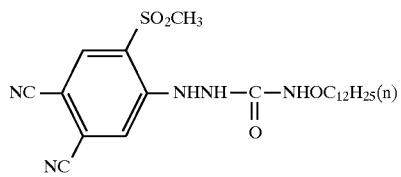
(33)
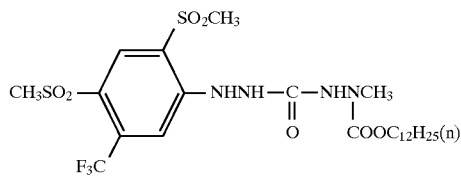
(34)

-continued
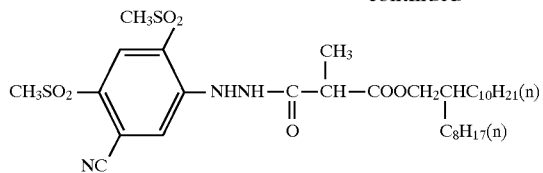
(35)
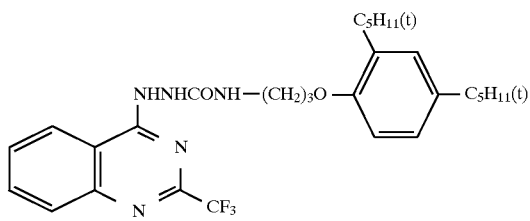
(36)
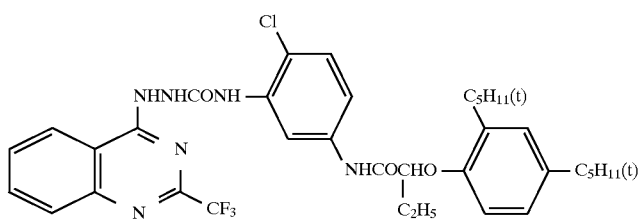
(37)
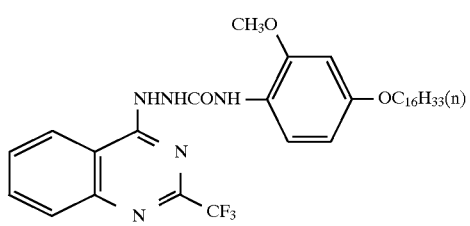
(38)
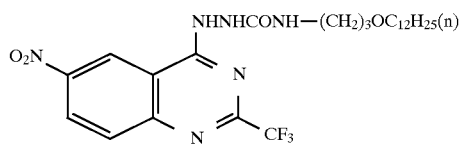
(39)
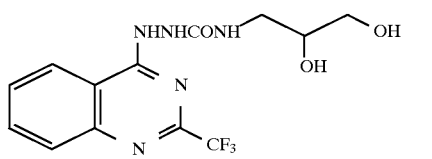
(40)
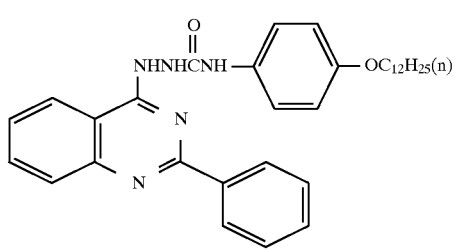
(41)
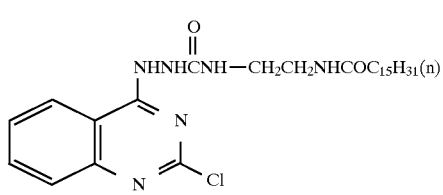
(42)

-continued
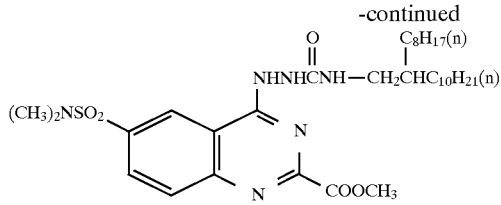 (43)
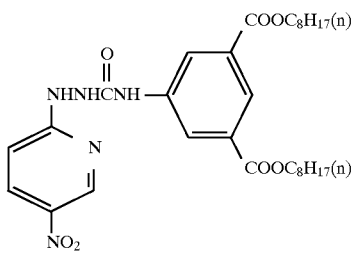 (44)
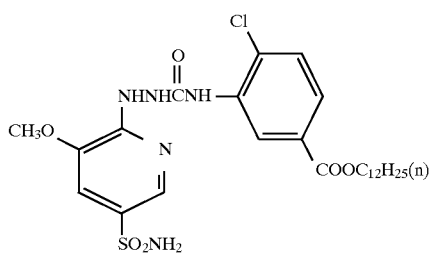 (45)
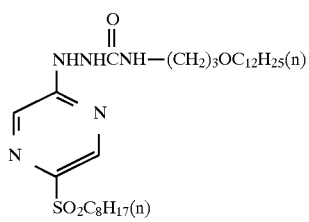 (46)
 (47)
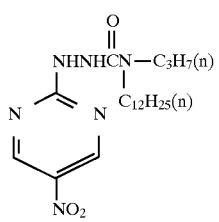 (48)
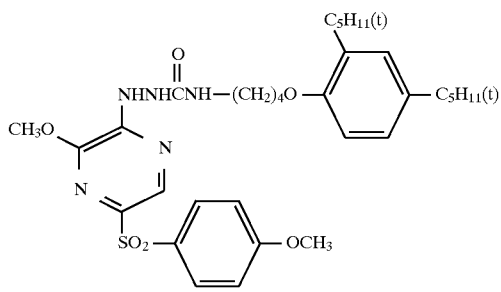 (49)

-continued
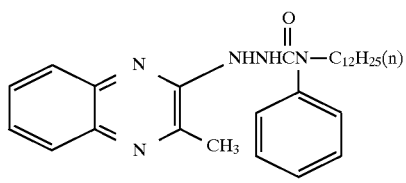
(50)
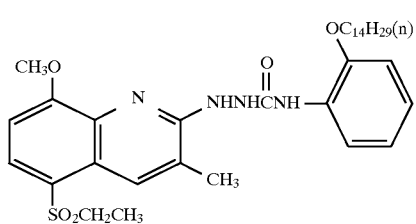
(51)
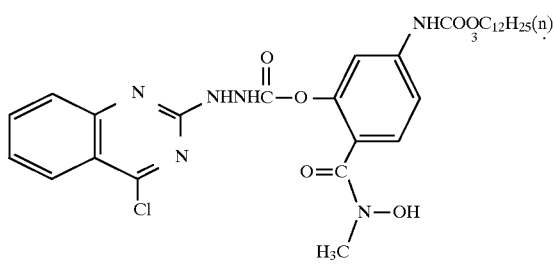
(52)
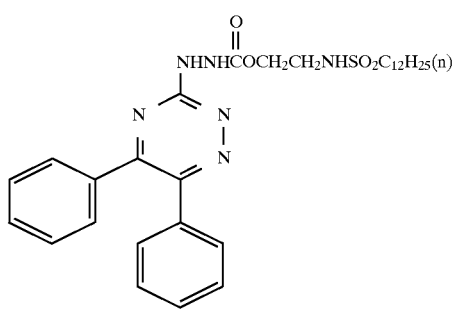
(53)
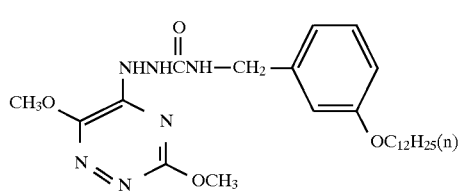
(54)
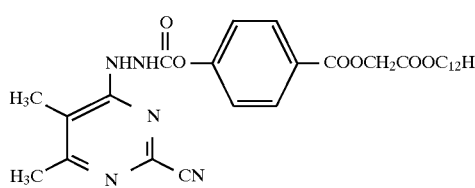
(55)
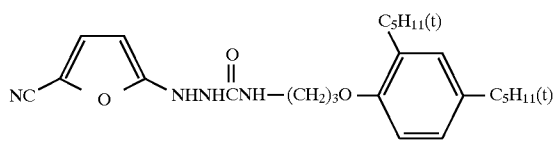
(56)

-continued
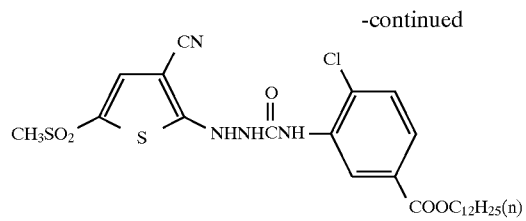 (57)
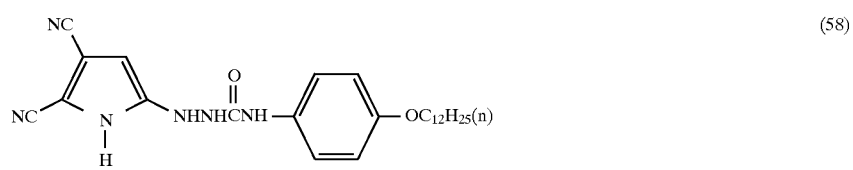 (58)
 (59)
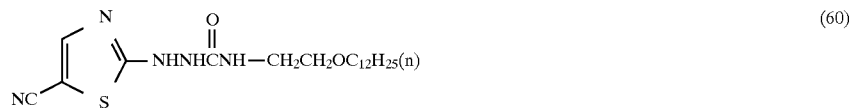 (60)
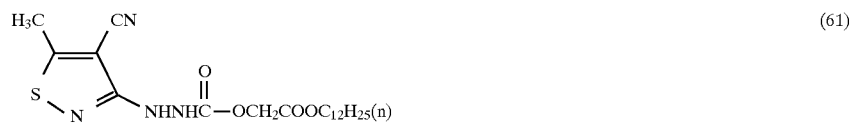 (61)
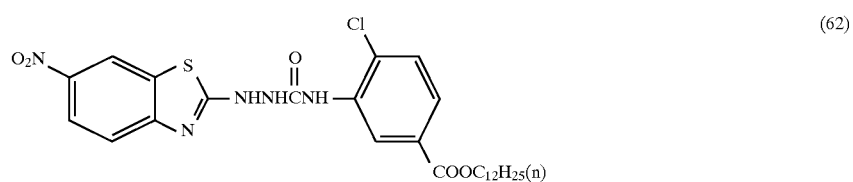 (62)
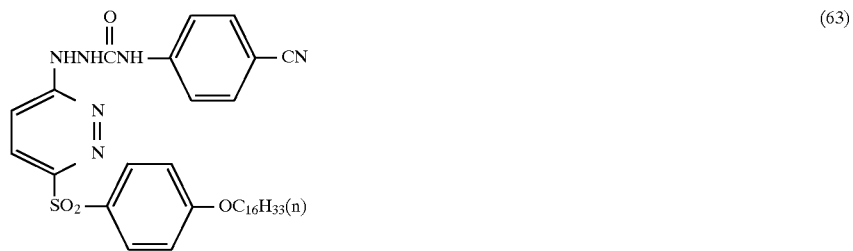 (63)
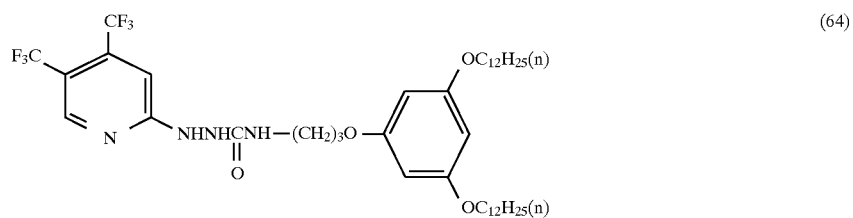 (64)
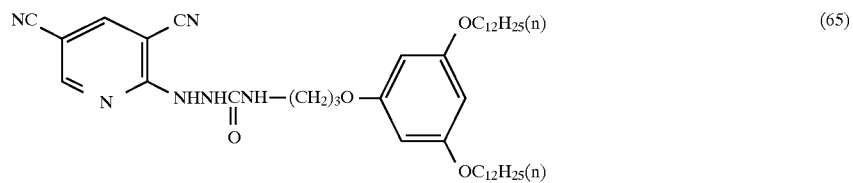 (65)

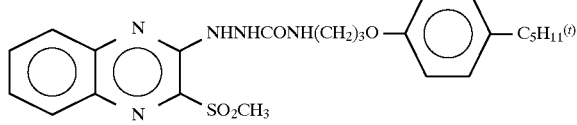 (66)
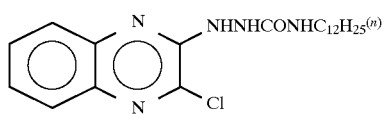 (67)
 (68)
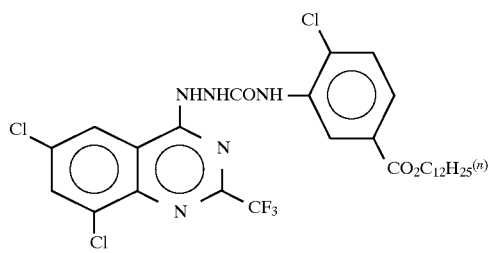 (69)
 (70)
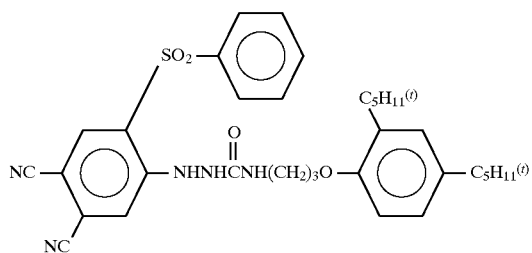 (71)
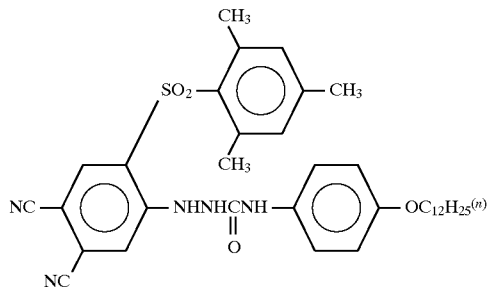 (72)
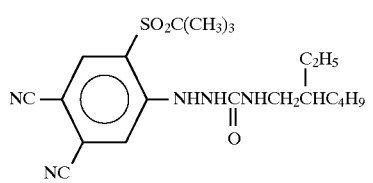 (73)

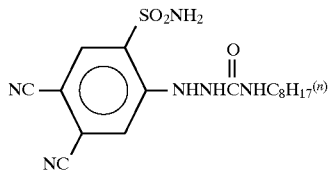
(74)

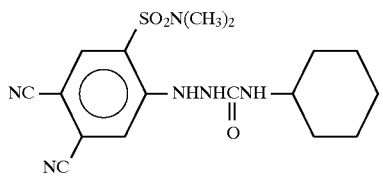
(75)

Now, general methods of synthesizing compounds represented by formula (I), (II), (III), or (IV) used in the present invention are described. These compounds can be synthesized, for example, by reacting compound represented by formula (IX-1) or (IX-2) with compound represented by formula (X-1) or compound represented by formula (XI-1) or (XI-2), wherein $R^1$, $R^2$, $R^3_1$, $X^1$ to $X^5$ have the same meanings as those defined in formulae (I) to (VIII), and Z represents $Z^1$ or $Z^2$.

Formula (IX-1):

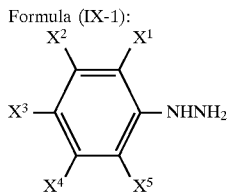

Formula (IX-2):

$R^3$—NHNH$_2$

Formula (X-1):

O=C=N—R$^1$

Formula (XI-1):

L-Z

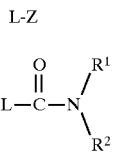

wherein L represents a group that is capable of coupling split-off by nucleophilic attack with a nucleophilic agent, such as an aryloxy group and a chlorine atom.

A general method for producing a compound represented by formula (V), (VI), (VII), or (VIII) according to the present invention is a method in which a compound represented by formula (I), (II), (III), or (IV) is oxidized by various kinds of oxidizing agents.

With respect to the oxidation method, an oxidation method described below can be used.

Typical synthetic examples of some compounds out of the compounds used in the present invention are shown below. Other compounds can also be synthesized in the same way as that for the following examples.

Synthetic Example 1. Synthesis of Exemplified Compound (5)

The synthesis is carried out by following the below-shown synthesis route:

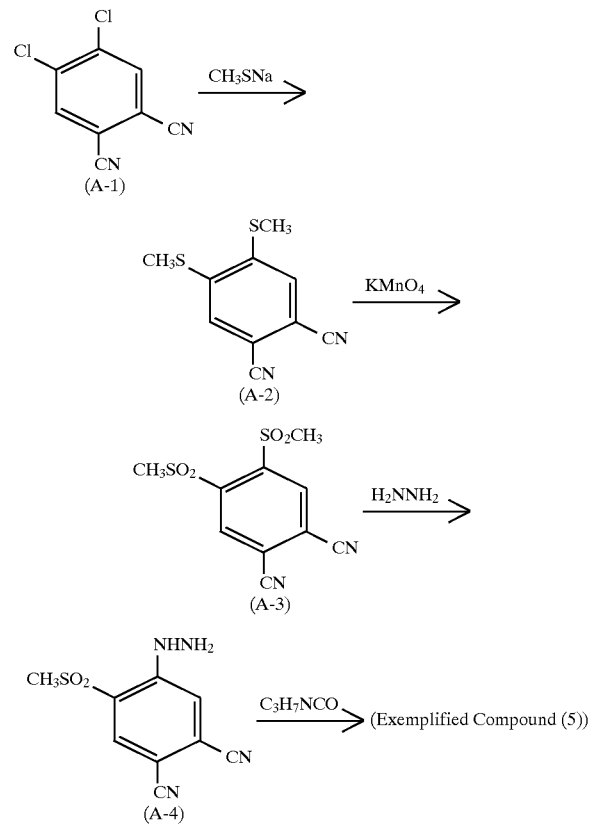

Synthesis of Compound (A-2)

53.1 g of 1,2-dichloro-4,5-dicyanobenzene (A-1) (CAS Registry No. 139152-08-2) was dissolved in 1.1 liters of N,N-dimethylformamide (DMF), and then 268 g of an aqueous methyl mercaptan sodium salt solution (15%) was added, dropwise, to the solution, at room temperature over 1 hour, followed by stirring at 60° C. for 1 hour. The reaction liquid was cooled to room temperature and the reaction liquid was poured into water, followed by stirring for 30 min. The produced white solid was filtered, washed with water, and dried. Yield: 46.5 g (78.1%).

Synthesis of Compound (A-3)

41.1 g of Compound (A-2) was suspended in 400 ml of acetic acid, and then a solution of 89.3 g of potassium permanganate in 400 ml of water was added, dropwise, over 1 hour under cooling with water. After the reaction mixture was allowed to stand overnight at room temperature, 2 liters of water and 2 liters of ethyl acetate were added thereto, and the mixture was filtered through Celite (trade name). The filtrate was separated, and the organic layer was washed with water, an aqueous sodium hydrosulfite solution, an aqueous sodium bicarbonate solution, and then brine, followed by drying over anhydrous magnesium sulfate. After filtering the dried organic layer, the solvent was distilled off, and an ethyl acetate/hexane mixed solvent was added to the residue, to effect crystallization, to obtain 29.4 g of a white solid of Compound (A-3). Yield: 55.0%.

Synthesis of Compound (A-4)

29.4 g of Compound (A-3) was dissolved in 200 ml of dimethylsulfoxide (DMSO), and 8.7 g of hydrazine monohydrate was added, dropwise, to the solution, over 15 min under cooling with water, followed by stirring for 10 min under cooling with water. The reaction liquid was poured into water, and the produced yellow solid was filtered, washed with water, and dried. Yield: 17.4 g (70.9%).

Synthesis of Exemplified Compound (5)

11.8 g of Compound (A-4) was dissolved in 50 ml of tetrahydrofuran, and 4.7 g of propyl isocyanate was added, dropwise, to the solution, at room temperature over 30 min, followed by stirring for 1 hour. The reaction mixture was poured into water, and extraction was effected with ethyl acetate. The organic layer was washed with hydrochloric acid and then brine; then it was dried over anhydrous magnesium sulfate, filtered, and the solvent was distilled off. The residue was crystallized from an ethyl acetate/hexane mixed solvent (1:10), to obtain 14.5 g of a white solid of Exemplified Compound (5). Yield: 90.2%.

Synthetic Example 2. Synthesis of Exemplified Compound (2)

The synthesis was made by following the below-shown synthesis route:

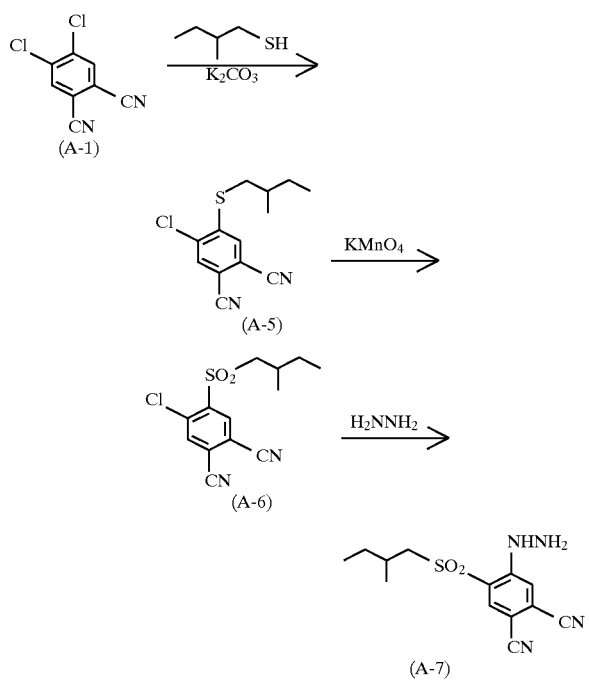

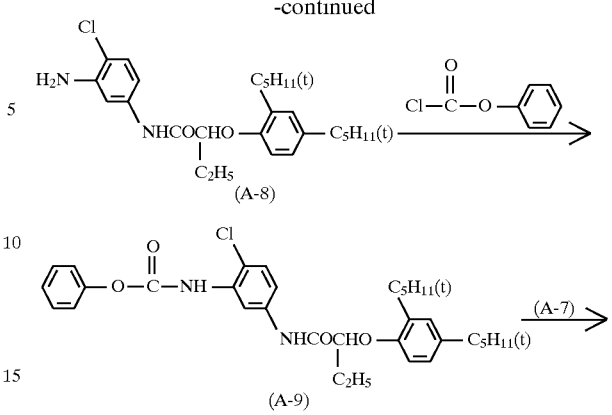

(Exemplified Compound (2))

Synthesis of Compound (A-5)

84.7 g of Compound (A-1) and 89.8 g of potassium carbonate were suspended in 600 ml of DMF, and then 60.3 ml of 2-methylbutylmercaptan was added, dropwise, to the suspension, at room temperature over 1 hour, followed by stirring at room temperature for 1 hour. The reaction mixture was poured into water and stirred for 10 min. The produced white solid was filtered, washed with water, and dried. Yield: 100.8 g (88.5%).

Synthesis of Compound (A-6)

98.0 g of Compound (A-5) was suspended in 500 ml of acetic acid and 500 ml of water, and to the suspension was added, dropwise, a solution of 88.5 g of potassium permanganate in 500 ml of water, at room temperature over 1 hour, followed by stirring at room temperature for 2 hours. Then 2 liters of water and 2 liters of ethyl acetate were added to the reaction mixture, followed by filtering through Celite. The filtrate was separated, and the organic layer was washed with water, an aqueous hydrosulfite solution, an aqueous sodium bicarbonate solution, and brine, followed by drying over anhydrous magnesium sulfate. After filtering the dried organic layer, the solvent was distilled off, and isopropyl alcohol was added to the residue, to effect crystallization, to obtain 53.2 g of a white solid of Compound (A-6). Yield: 48.4%.

Synthesis of Compound (A-7)

50.5 g of Compound (A-6) was dissolved in 100 ml of DMSO, and then 17.0 g of hydrazine monohydrate was added, dropwise, thereto, over 10 min under cooling with ice, followed by stirring at room temperature for 30 min. The reaction mixture was poured into water, and extraction was carried out with ethyl acetate. The organic layer was washed with water and dried over anhydrous magnesium sulfate. After filtering the dried organic layer, the solvent was distilled off, and the residue was purified by silica gel chromatography, using methylene chloride as an eluent. Crystallization was carried out from ethyl acetate/hexane (1:2), to obtain 31.4 g of a yellow solid of Compound (A-7). Yield: 63.2%.

Synthesis of Compound (A-9)

44.5 g of Compound (A-8) (CAS Registry No. 51461-11-1) was dissolved in 500 ml ethyl acetate, and then a solution of 25 g of sodium bicarbonate in 500 ml of water was added to the solution. To the resulting solution was added, dropwise, 16.4 g of phenyl chlorocarbonate, at room temperature over 30 min, followed by stirring for a further 1 hour. The layers were separated, the organic layer was washed with brine and dried over anhydrous magnesium sulfate, and after filtering the dried organic layer, the solvent was distilled off, to obtain 54.0 g of a pale yellow oil of Compound (A-9). Yield: 95.6%.

Synthesis of Exemplified Compound (2)

5.8 g of Compound (A-7), 11.3 g of Compound (A-9), and 0.60 g of DMAP (N,N-dimethylaminopyridine) were dissolved in 100 ml of acetonitrile, and the solution was stirred at 60° C. for 3 hours. The reaction mixture was poured into water, and extraction with ethyl acetate was carried out. The organic layer was washed with an aqueous sodium bicarbonate solution, hydrochloric acid, and then brine; then it was dried over anhydrous magnesium sulfate, and after filtration of the dried organic layer was carried out, the solvent was distilled off. The residue was purified by silica gel column chromatography (eluent:ethyl acetate/hexane= ½), and crystallization from hexane was carried out, to obtain 8.0 g of a white solid of Exemplified Compound (2). Yield: 52.4%.

Synthetic Example 3. Synthesis of Exemplified Compound (1)

The synthesis was carried out by following the synthesis route shown below:

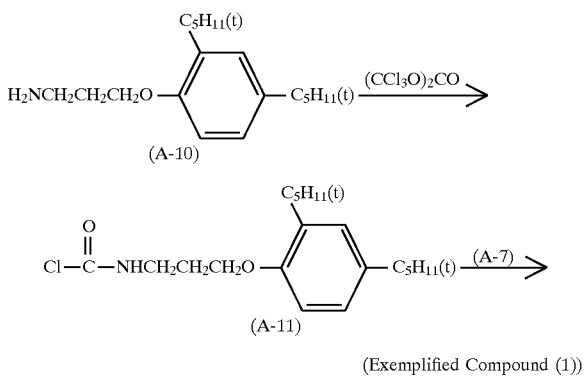

(Exemplified Compound (1))

Synthesis of Exemplified Compound (1)

4.6 g of triphosgene was dissolved in 100 ml of THF, and to the solution were added, dropwise, 13.6 g of Compound (A-10) (CAS Registry No. 61053-26-7), at room temperature over 10 min, and then 18.7 ml of triethylamine, at room temperature over 10 min. Reaction was carried out for 30 min, to obtain a solution of Compound (A-11). To this solution was added 13.0 g of Compound (A-7), in portions, at room temperature over 10 min. After the reaction mixture was stirred for a further 1 hour, the reaction mixture was poured into water, and extraction with ethyl acetate was carried out. After the organic layer was washed with an aqueous sodium bicarbonate solution, hydrochloric acid, and then brine, the organic layer was dried over anhydrous magnesium sulfate. After the dried organic layer was filtered, the solvent was distilled off. The residue was purified by silica gel column chromatography, and crystallization from ethyl acetate/hexane 1:10 mixture was carried out, to obtain a white solid of Exemplified Compound (1). Yield: 17.0 g (61.3%).

Synthetic Example 4. Synthesis of Exemplified Compound (37)

The synthesis was carried out by following the synthesis route given below:

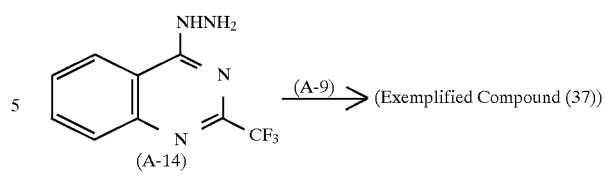

Similarly to Synthetic Example 2, the synthesis was carried out by using 6.0 g of Compound (A-14) (European Patent No. 545491A1), 14.98 g of Compound (A-9), and 0.5 g of DMAP, to obtain a white solid of Exemplified Compound (37). Yield: 12.0 g (65.3%).

Synthetic Example 5. Synthesis of Exemplified Compound (36)

Similarly to Synthetic Example 3, the synthesis was carried out by using Compound (A-11), prepared similarly to Synthetic Example 3 from 5.8 g of Compound (A-10), and 4.3 g of Compound (A-14), to obtain a white solid of Exemplified Compound (36). Yield: 6.7 g (61.5%).

Synthetic Example 6. Synthesis of Oxidation Product of Exemplified Compound (5)

In 100 ml of tetrahydrofuran was dissolved 1.0 g of exemplified compound (5), and then to this was added 3.0 g of manganese dioxide, and they were allowed to react for 30 min at room temperature. The resultant reaction liquid was suction-filtered through Celite (trade name). After that, a solvent was removed by distillation from the filtrate under reduced pressure. Crystallization was conducted by adding hexane to the residue. As a result, 0.95 g of the oxidation product of exemplified compound (5) was obtained, as a violet-brown solid. Yield: 95.6%.

Synthetic Example 7. Synthesis of Oxidation Product of Exemplified Compound (36)

According to the same operation as in Synthetic Example 6, except for employing 1.0 g of exemplified compound (36) and 5.0 g of manganese dioxide, 0.93 g of the oxidation product of the exemplified compound (36) was obtained, as an orange solid. Yield: 93.3%

The oxidizing agent for use in the present invention may be an inorganic compound, such as silver oxide, manganese dioxide, and silver halide; or an organic compound, such as N-chlorosuccinimide. Alternatively, oxygen in air may be used as the oxidizing agent.

The terminology "coupling component" herein referred to is generally a compound that has nucleophilicity, and it means a compound that reacts with a diazonium salt to produce an azo dye compound. Usually, the coupling position of the coupling component is unsubstituted, or it is substituted with a specific substituent, such as a formyl group or a carboxyl group. The coupling component whose coupling position is substituted with a substituent other than the above-described groups provides an extremely low yield, not only in the reaction with a diazonium salt but also in the reaction with a sulfonylhydrazine compound. In contrast, a characteristic of the present invention is that an azo dye can be produced in a high yield, even when a coupling component whose coupling position (reactive site) is substituted with various kinds of splitting-off groups (as described in detail hereinafter) is employed.

Examples of the coupling component for use in the present invention include phenols. A compound that is called a coupler in the field of the photographic industry is preferably used.

Specific examples of the couplers are described in detail, for example, in "Theory of Photographic Process" (4th edition, Ed., T. H. James, Macmillan, 1977), pages 291 to 334 and 354 to 361, and in JP-A Nos. 12353/1983, 149046/1983, 149047/1983, 11114/1984, 124399/1984, 174835/1984, 231539/1984, 231540/1994, 2951/1985, 14242/1985, 23474/1985, and 66249/1985.

Examples of couplers that are preferably used in the present invention are listed below:

As couplers that are preferably used in the present invention, compounds having structures described by the following formulae (1) to (12) are mentioned. They are compounds collectively generally referred to as active methylenes, pyrazolones, pyrazoloazoles, phenols, naphthols, and pyrrolotriazoles, respectively, which are compounds known in the field of the photographic industry.

  (1)

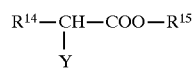  (2)

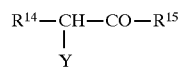  (3)

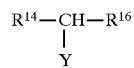  (4)

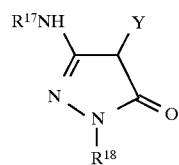  (5)

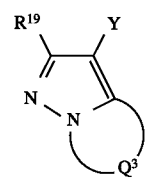  (6)

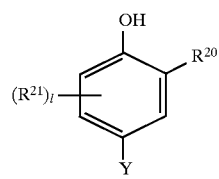  (7)

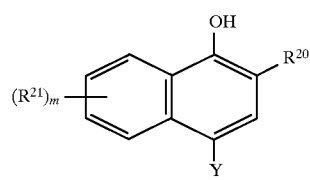  (8)

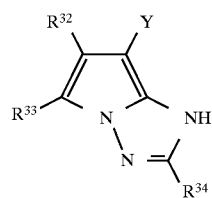  (9)

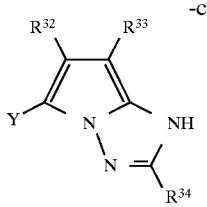  (10)

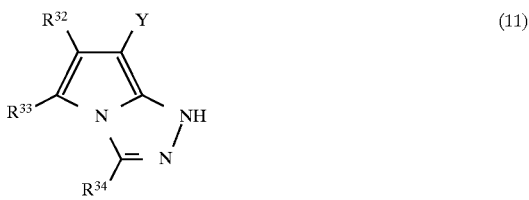  (11)

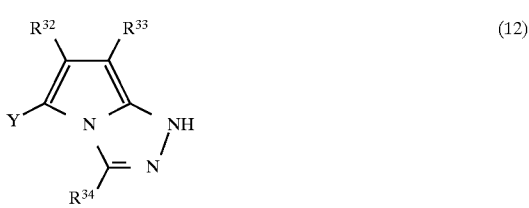  (12)

Formulae (1) to (4) represent couplers that are called active methylene-series couplers, and, in the formulae, $R^{14}$ represents an acyl group, a cyano group, a nitro group, an aryl group, a heterocyclic residue, an alkoxycarbonyl group, an aryloxycarbonyl group, a carbamoyl group, a sulfamoyl group, an alkylsulfonyl group, or an arylsulfonyl group, optionally substituted.

In formulae (1) to (3), $R^{15}$ represents an optionally substituted alkyl group, aryl group, or heterocyclic residue. In formula (4), $R^{16}$ represents an optionally substituted aryl group or heterocyclic residue. Examples of the substituent that may be possessed by $R^{14}$, $R^{15}$, and $R^{16}$ include those mentioned for $X^1$ to $X^5$.

In formulae (1) to (4), Y represents a hydrogen atom or a group capable of coupling split-off by coupling reaction with the oxidized product of the compounds represented by formulae (I) to (IV). Examples of Y are a heterocyclic group (a saturated or unsaturated 5-membered to 7-membered monocyclic or condensed ring having as a hetero atom at least one nitrogen atom, oxygen atom, sulfur atom, or the like, e.g. succinimido, maleinimido, phthalimido, diglycolimido, pyrrole, pyrazole, imidazole, 1,2,4-triazole, tetrazole, indole, benzopyrazole, benzimidazole, benzotriazole, imidazolin-2,4-dione, oxazolidin-2,4-dione, thiazolidin-2,4-dione, imidazolidin-2-one, oxazolin-2-one, thiazolin-2-one, benzimidazolin-2-one, benzoxazolin-2-one, benzthiazolin-2-one, 2-pyrrolin-5-one, 2-imidazolin-5-one, indolin-2,3-dione, 2,6-dioxypurine, parabic acid, 1,2,4-triazolidin-3,5-dione, 2-pyridone, 4-pyridone, 2-pyrimidone, 6-pyridazone, 2-pyrazone, 2-amino-1,3,4-thiazolidine, and 2-imino-1,3,4-thiazolidin-4-one), a halogen atom (e.g. a chlorine atom and a bromine atom), an aryloxy group (e.g. phenoxy and 1-naphthoxy), a heterocyclic oxy group (e.g. pyridyloxy and pyrazolyoxy), an acyloxy group (e.g. acetoxy and benzoyloxy), an alkoxy group (e.g. methoxy and dodecyloxy), a carbamoyloxy group (e.g. N,N-diethylcarbamoyloxy and morpholinocarbonyloxy), an aryloxycarbonyloxy group (e.g. phenylcarbonyloxy), an alkoxycarbonyloxy group (e.g. methoxycarbonyloxy and ethoxycarbonyloxy), an arylthio group (e.g. phenylthio and naphthylthio), a heterocyclic thio group (e.g. tetrazolylthio, 1,3,4-thiadiazolylthio, 1,3,4-oxadiazolylthio, and benzimidazolylthio), an alkylthio group (e.g. methylthio, octylthio, and hexadecylthio), an alkylsulfonyloxy group (e.g. methanesulfonyloxy), an arylsulfonyloxy group (e.g. benzenesulfonyloxy and toluenesulfonyloxy), a carbonamido group (e.g. acetamido and trifluoroacetamido), a sulfonamido group (e.g. methanesulfonamido and benzenesulfonamido), an alkylsulfonyl group (e.g. methanesulfonyl), an arylsulfonyl group (e.g. benzenesulfonyl), an alkylsulfinyl group (e.g. methanesulfinyl), an arylsulfinyl group (e.g. benzenesulfinyl), an arylazo group (e.g. phenylazo and naphthylazo), and a carbamoylamino group (e.g. N-methylcarbamoylamino).

Y may be substituted, and examples of the substituent that may be possessed by Y include those mentioned for $X^1$ to $X^5$.

Preferably Y represents a hydrogen atom, a halogen atom, an aryloxy group, a heterocyclic oxy group, an acyloxy group, an aryloxycarbonyloxy group, an alkoxycarbonyloxy group, or a carbamoyloxy group.

In formulae (1) to (4), $R^{14}$ and $R^{15}$, and $R^{14}$ and $R^{16}$, may bond together to form a ring.

Formula (5) represents a coupler that is called a 5-pyrazolone-series coupler, and in the formula, $R^{17}$ represents an alkyl group, an aryl group, an acyl group, or a carbamoyl group. $R^{18}$ represents a phenyl group or a phenyl group that is substituted by one or more halogen atoms, alkyl groups, cyano groups, alkoxy groups, alkoxycarbonyl groups, or acylamino groups.

Preferable 5-pyrazolone-series couplers represented by formula (5) are those wherein $R^{17}$ represents an aryl group or an acyl group, and $R^{18}$ represents a phenyl group that is substituted by one or more halogen atoms.

With respect to these preferable groups, more particularly, $R^{17}$ is an aryl group, such as a phenyl group, a 2-chlorophenyl group, a 2-methoxyphenyl group, a 2-chloro-5-tetradecaneamidophenyl group, a 2-chloro-5-(3-octadecenyl-1-succinimido)phenyl group, a 2-chloro-5-octadecylsulfonamidophenyl group, and a 2-chloro-5-[2-(4-hydroxy-3-t-butylphenoxy)tetradecaneamido]phenyl group; or $R_{17}$ is an acyl group, such as an acetyl group, a 2-(2,4-di-t-pentylphenoxy)butanoyl group, a benzoyl group, and a 3-(2,4-di-t-amylphenoxyacetamido)benzoyl group, any of which may have a substituent, such as a halogen atom or an organic substituent that is bonded through a carbon atom, an oxygen atom, a nitrogen atom, or a sulfur atom. Y has the same meaning as defined above.

Preferably $R^{18}$ represents a substituted phenyl group, such as a 2,4,6-trichlorophenyl group, a 2,5-dichlorophenyl group, and a 2-chlorophenyl group.

Formula (6) represents a coupler that is called a pyrazoloazole-series coupler, and, in the formula, $R^{19}$ represents a hydrogen atom or a substituent. $Q^3$ represents a group of nonmetal atoms required to form a 5-membered azole ring having 2 to 4 nitrogen atoms, which azole ring may have a substituent (including a condensed ring).

Preferable pyrazoloazole-series couplers represented by formula (6), in view of spectral absorption characteristics of the color-formed dyes, are imidazo[1,2-b]pyrazoles described in U.S. Pat. No. 4,500,630, pyrazolo[1,5-b]-1,2,4-triazoles described in U.S. Pat. No. 4,500,654, and pyrazolo[5,1-c]-1,2,4-triazoles described in U.S. Pat. No. 3,725,067.

Details of substituents of the azole rings represented by the substituents $R^{19}$ and $Q^3$ are described, for example, in U.S. Pat. No. 4,540,654, the second column, line 41, to the eighth column, line 27. Preferable pyrazoloazole-series couplers are pyrazoloazole couplers having a branched alkyl group directly bonded to the 2-, 3-, or 6-position of the pyrazolotriazole group, as described in JP-A No. 65245/1986; pyrazoloazole couplers containing a sulfonamido group in the molecule, as described in JP-A No. 65245/1986; pyrazoloazole couplers having an alkoxyphenylsulfonamido ballasting group, as described in JP-A No. 147254/1986; pyrazolotriazole couplers having an alkoxy group or an aryloxy group at the 6-position, as described in JP-A No. 209457/1987 or 307453/1988; and pyrazolotriazole couplers having a carbonamido group in the molecule, as described in Japanese Patent Application No. 22279/1989. Y has the same meaning as defined above.

Formulae (7) and (8) are respectively called phenol-series couplers and naphthol-series couplers, and in the formulae $R^{20}$ represents a hydrogen atom or a group selected from the group consisting of $-CONR^{22}R^{23}$, $-SO_2NR^{22}R^{23}$, $-NHCOR^{22}$, $-NHCONR^{22}R^{23}$, and $-NHSO_2NR^{22}R^{23}$. $R^{22}$ and $R^{23}$ each represent a hydrogen atom or a substituent. In formulae (7) and (8), $R^{21}$ represents a substituent, 1 is an integer selected from 0 to 2, and m is an integer selected from 0 to 4. When 1 and m are 2 or more, $R^{21}$'s may be different. The substituents of $R^{21}$ to $R^{23}$ include those mentioned above as examples for $X^1$ to $X^5$. Y has the same meaning as defined above.

Preferable examples of the phenol-series couplers represented by formula (7) include 2-acylamino-5-alkylphenol couplers described, for example, in U.S. Pat. Nos. 2,369,929, 2,801,171, 2,772,162, 2,895,826, and 3,772,002; 2,5-diacylaminophenol couplers described, for example, in U.S. Pat. Nos. 2,772,162, 3,758,308, 4,126,396, 4,334,011, and 4,327,173, West Germany Patent Publication No. 3,329,729, and JP-A No. 166956/1984; and 2-phenylureido-5-acylaminophenol couplers described, for example, in U.S. Pat. Nos. 3,446,622, 4,333,999, 4,451,559, and 4,427,767. Y has the same meaning as defined above.

Preferable examples of the naphthol-series couplers represented by formula (8) include 2-carbamoyl-1-naphthol couplers described, for example, in U.S. Pat. Nos. 2,474,293, 4,052,212, 4,146,396, 4,282,233, and 4,296,200; and 2-carbamoyl-5-amido-1-naphthol couplers described, for example, in U.S. Pat. No. 4,690,889. Y has the same meaning as defined above.

Formulas (9) to (12) are couplers called pyrrolotriazoles, and $R^{32}$, $R^{33}$, and $R^{34}$ each represent a hydrogen atom or a substituent. Y has the same meaning as defined above. Examples of the substituent of $R^{32}$, $R^{33}$, and $R^{34}$ include those mentioned for $X^1$, $X^2$, $X^3$, $X^4$, and $x^5$. Preferable examples of the pyrrolotriazole-series couplers represented by formulae (9) to (12) include those wherein at least one of $R^{32}$ and $R^{33}$ is an electron-attracting group, which specific couplers are described in European Patent Nos. 488,248A1, 491,197A1, and 545,300. Y has the same meaning as defined above.

Further, a fused-ring phenol, an imidazole, a pyrrole, a 3-hydroxypyridine, an active methylene, an active methine, a 5,5-ring-fused heterocyclic, and a 5,6-ring-fused heterocyclic coupler, can be used.

As the fused phenol couplers, those described, for example, in U.S. Pat. Nos. 4,327,173, 4,564,586, and 4,904,575 can be used.

As the imidazole couplers, those described, for example, in U.S. Pat. Nos. 4,818,672 and 5,051,347 can be used.

As the 3-hydroxypyridine couplers, those described, for example, in JP-A No. 315736/1989 can be used.

As the active methylene and active methine couplers, those described, for example, in U.S. Pat. Nos. 5,104,783 and 5,162,196 can be used.

As the 5,5-ring-fused heterocyclic couplers, for example, pyrrolopyrazole couplers described in U.S. Pat. No. 5,164,289, and pyrroloimidazole couplers described in JP-A No. 174429/1992, can be used.

As the 5,6-ring-fused heterocyclic couplers, for example, pyrazolopyrimidine couplers described in U.S. Pat. No. 4,950,585, pyrrolotriazine couplers described in JP-A No. 204730/1992, and couplers described in European Patent No. 556,700, can be used.

In the present invention, in addition to the above couplers, use can be made of couplers described, for example, in West Germany Patent Nos. 3,819,051A and 3,823,049, U.S. Pat. Nos. 4,840,883, 5,024,930, 5,051,347, and 4,481,268, European Patent Nos. 304,856A2, 329,036, 354,549A2, 374,781A2, 379,110A2, and 386,930A1, and JP-A Nos. 141055/1988, 32260/1989, 32261/1989, 297547/1990, 44340/1990, 110555/1990, 7938/1991, 160440/1991, 172839/1991, 172447/1992, 179949/1992, 182645/1992, 184437/1992, 188138/1992, 188139/1992, 194847/1992, 204532/1992, 204731/1992, and 204732/1992.

Specific examples of the couplers that can be used in the present invention are shown below, but, of course, the present invention is not limited to them:

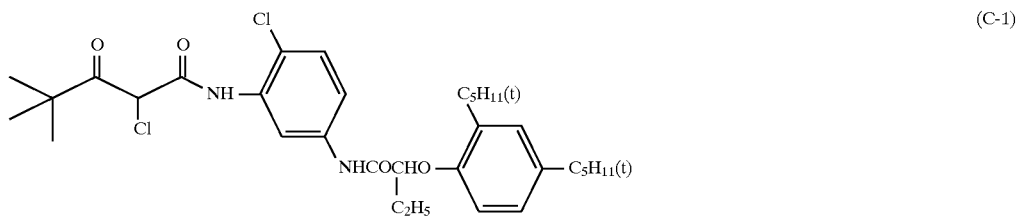
(C-1)

(C-2)

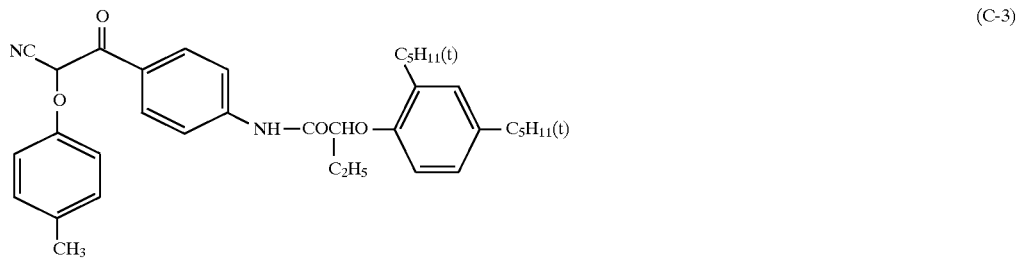
(C-3)

(C-4)

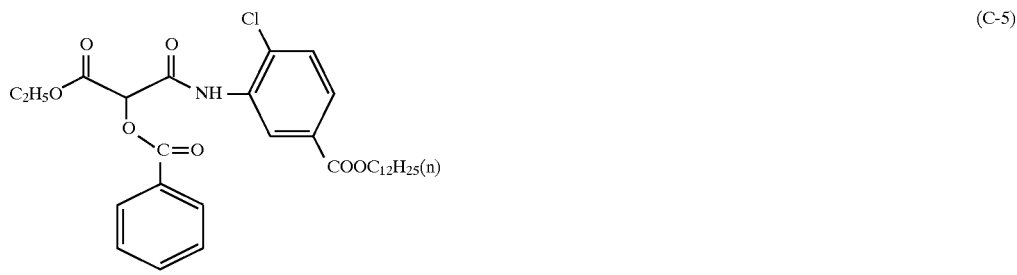
(C-5)

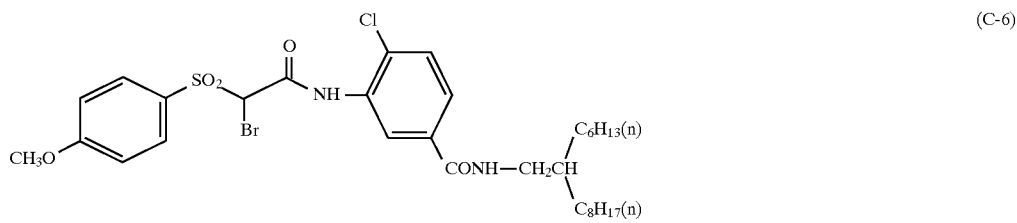
(C-6)

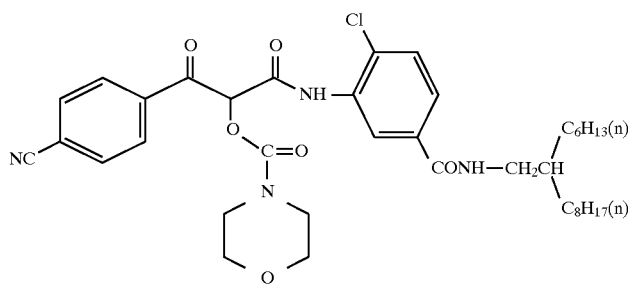
(C-7)
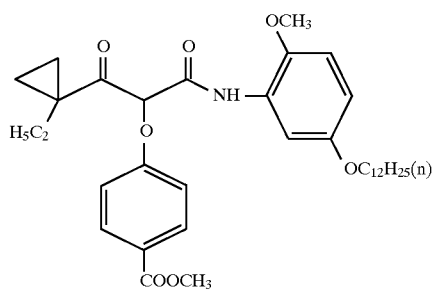
(C-8)
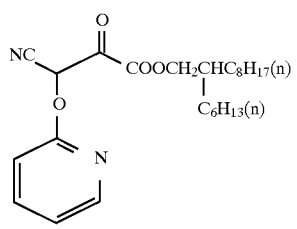
(C-9)
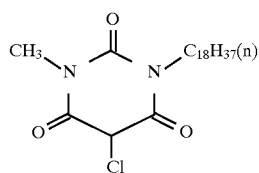
(C-10)
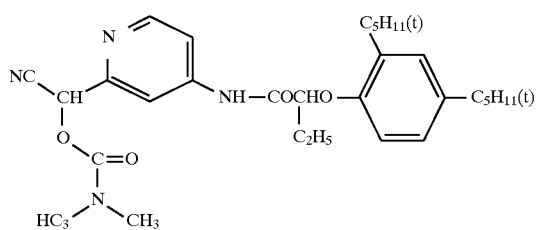
(C-11)
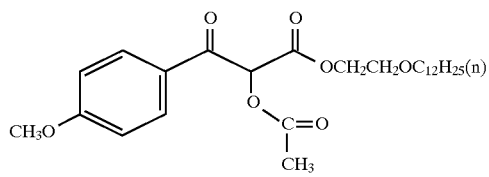
(C-12)
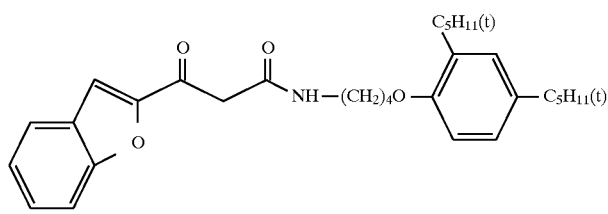
(C-13)

-continued
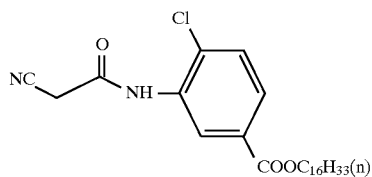
(C-14)
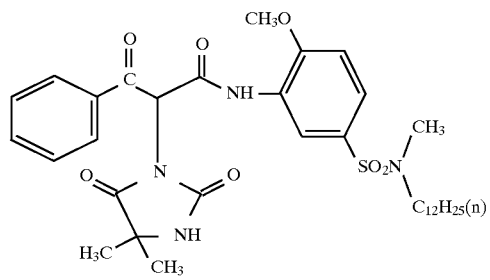
(C-15)
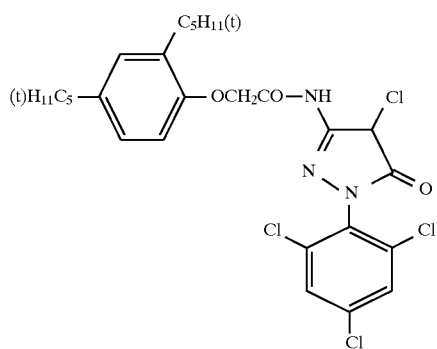
(C-16)
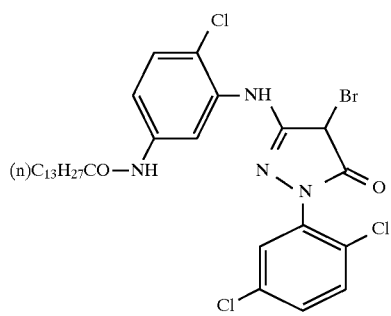
(C-17)
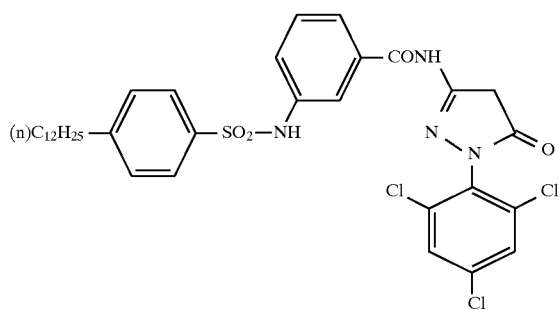
(C-18)

-continued
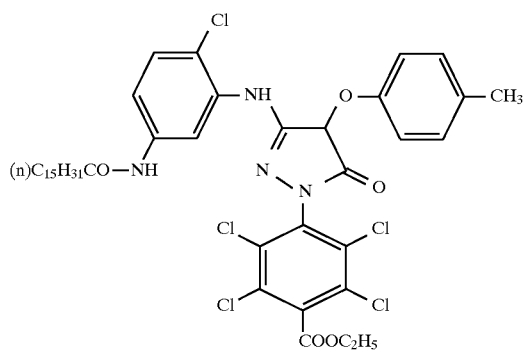
(C-19)
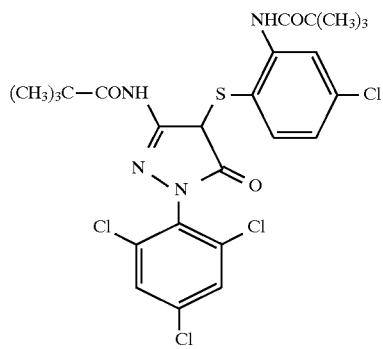
(C-20)
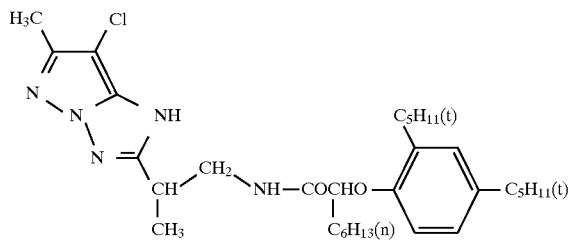
(C-21)
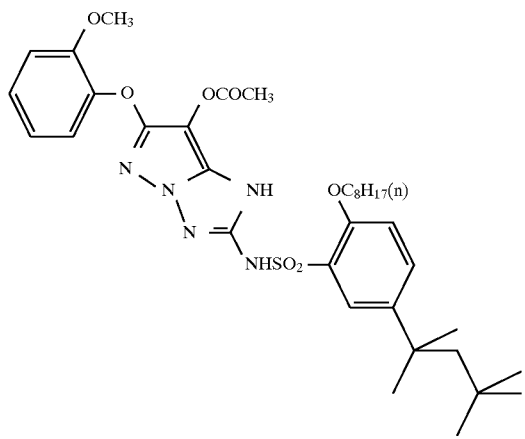
(C-22)

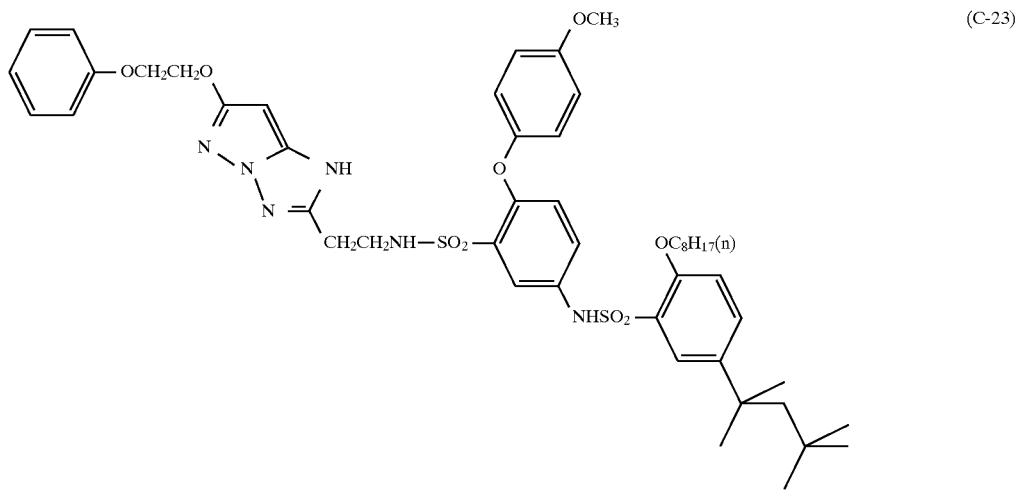
(C-23)
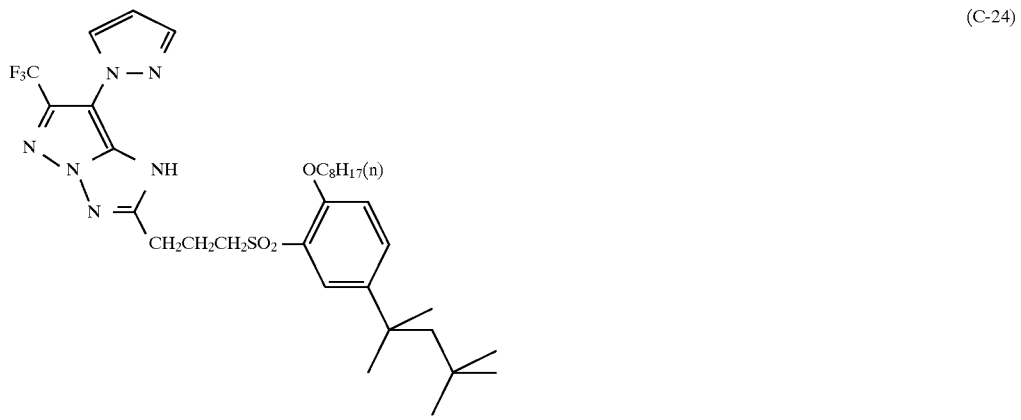
(C-24)
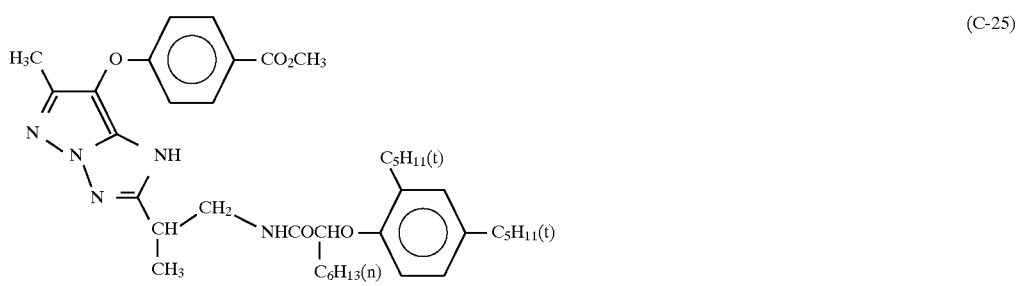
(C-25)
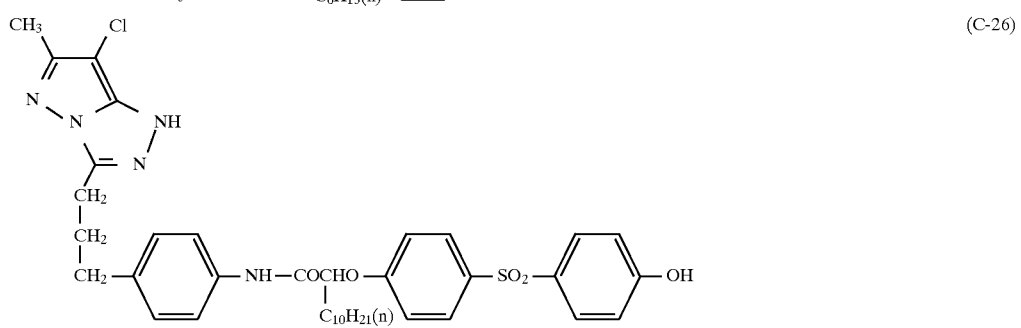
(C-26)

(C-27)
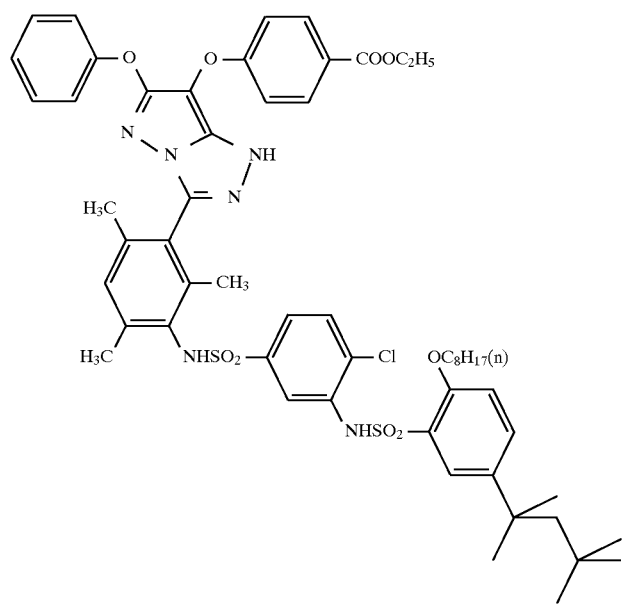
(C-28)
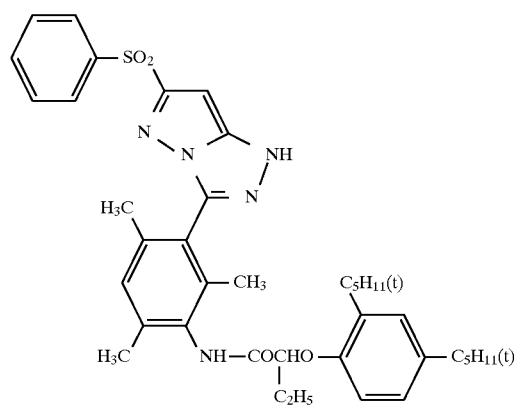
(C-29)

-continued
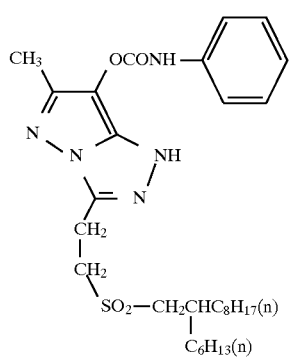
(C-30)
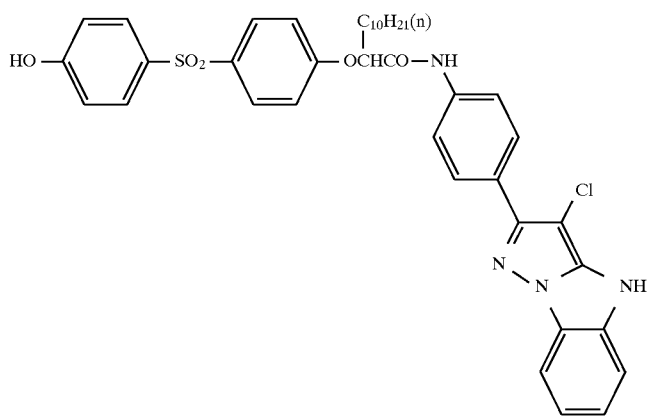
(C-31)
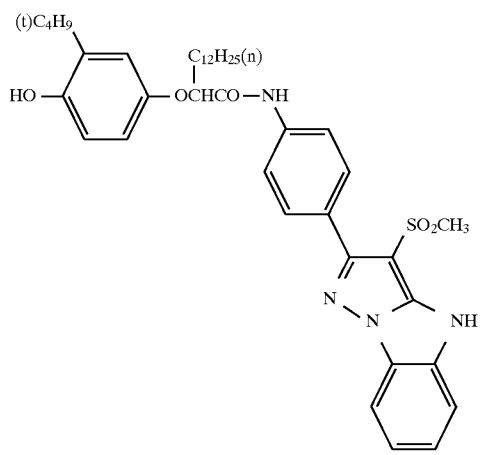
(C-32)
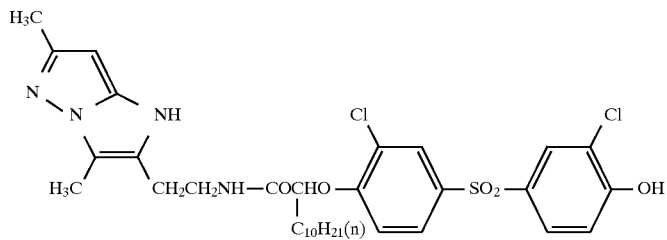
(C-33)

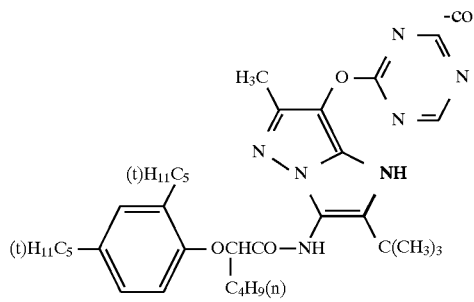 (C-34)
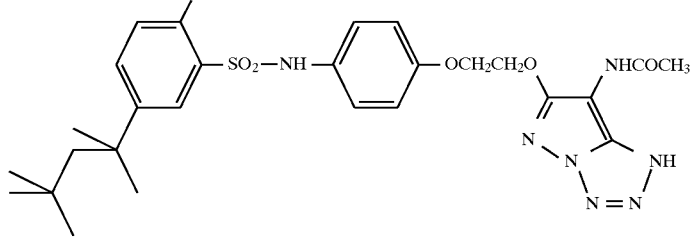 (C-35)
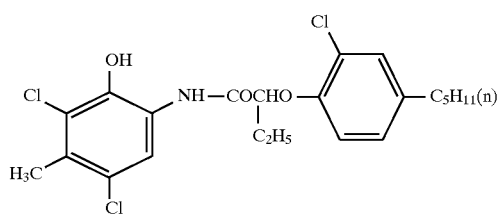 (C-36)
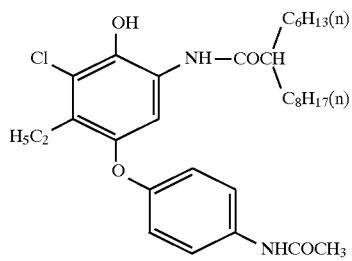 (C-37)
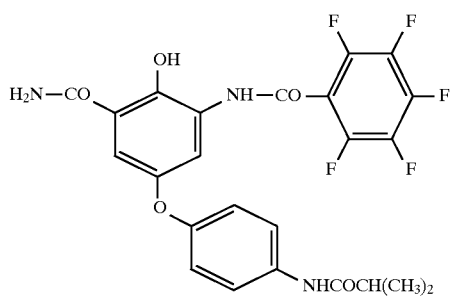 (C-38)
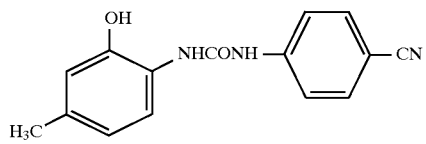 (C-39)
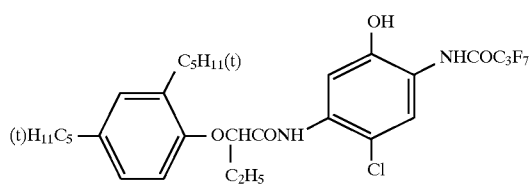 (C-40)

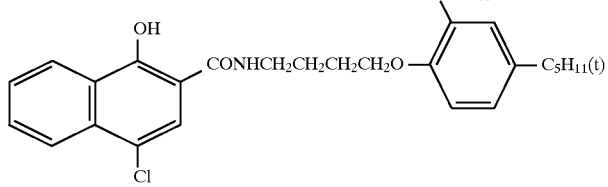
(C-41)
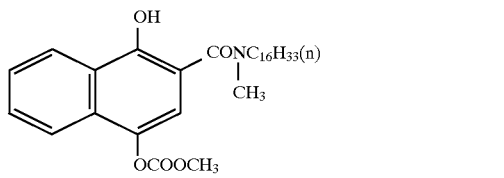
(C-42)
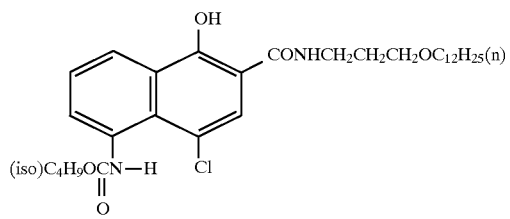
(C-43)
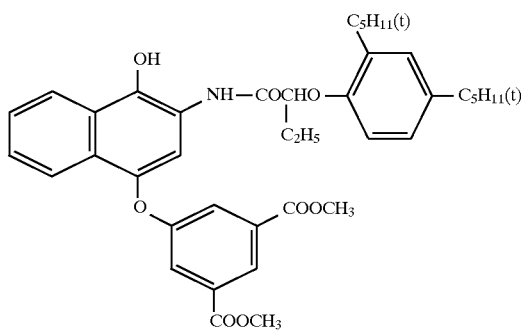
(C-44)
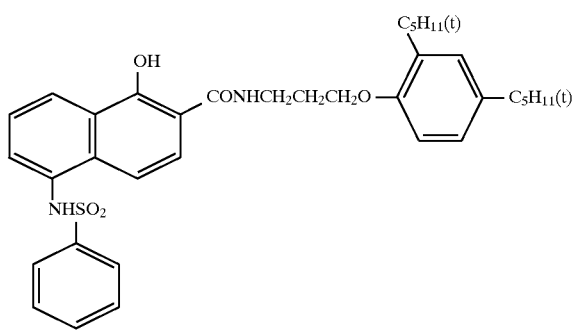
(C-45)

(C-46)
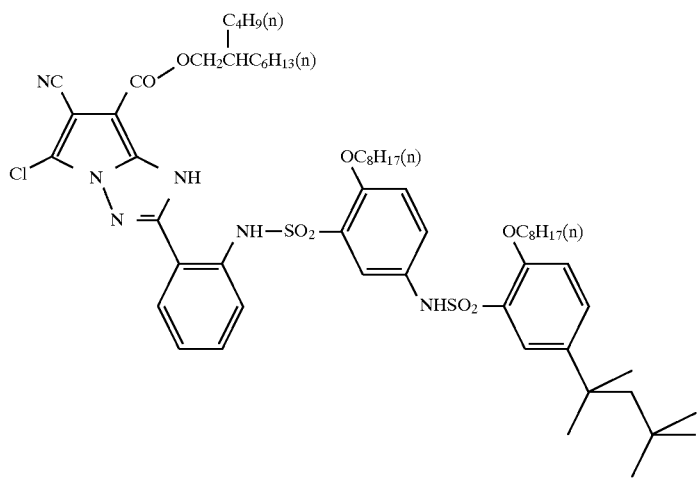
(C-47)
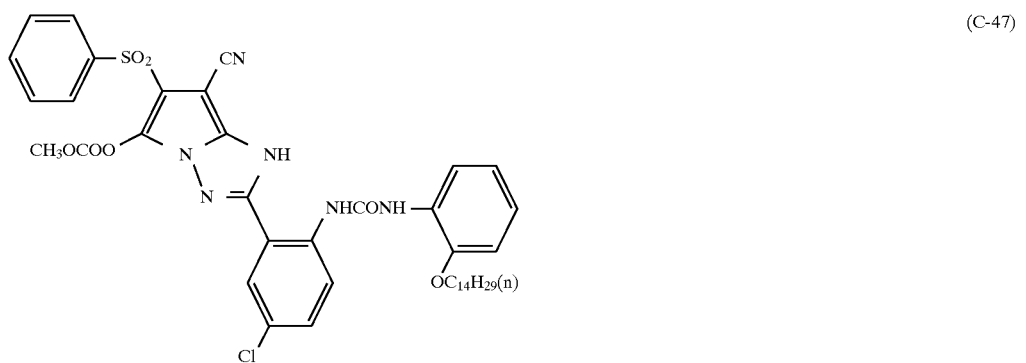
(C-48)
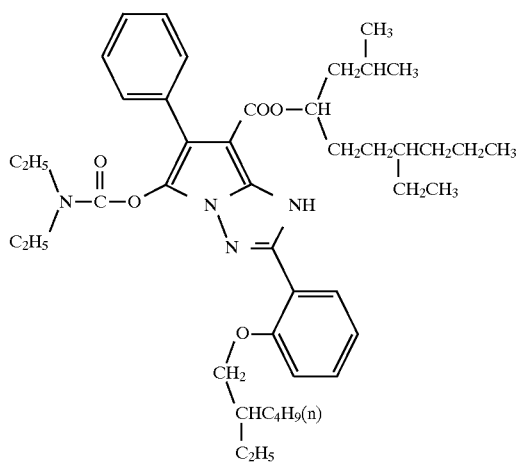
(C-49)
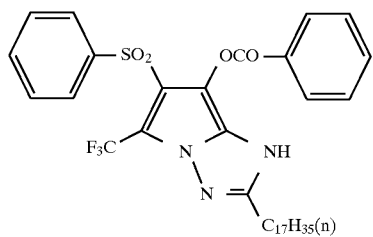

-continued
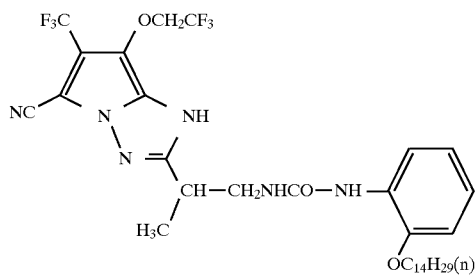
(C-50)
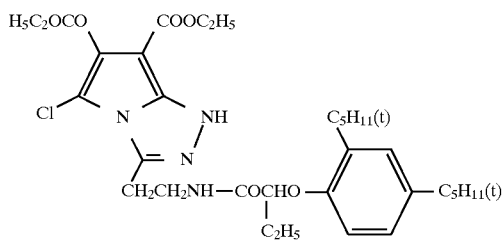
(C-51)
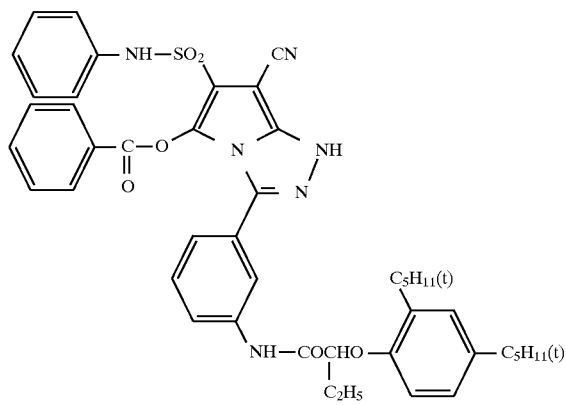
(C-52)
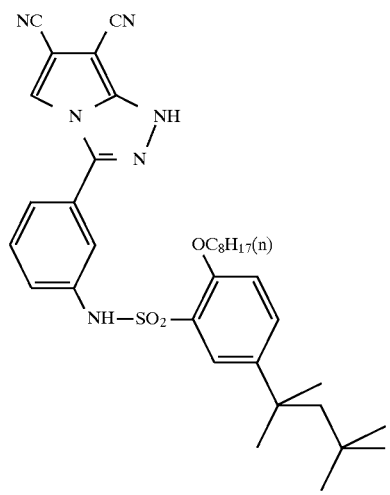
(C-53)

(C-54)
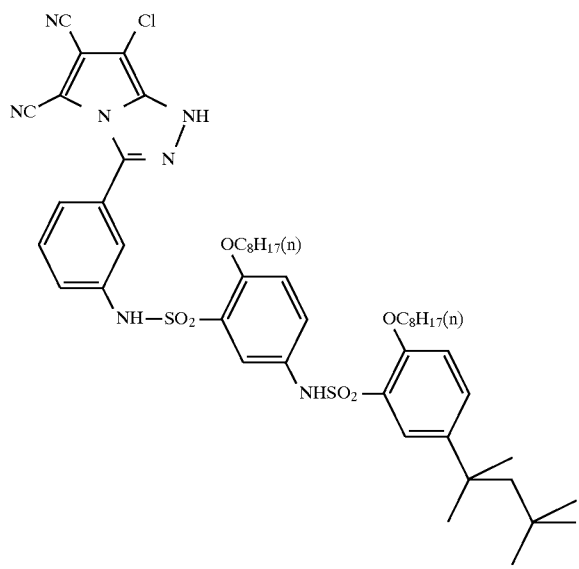
(C-55)
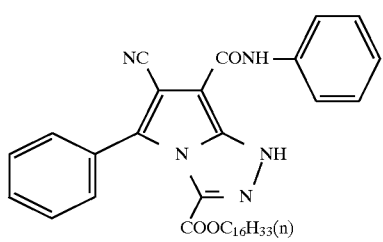
(C-56)
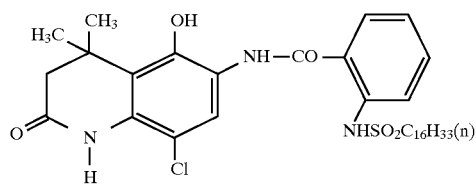
(C-57)
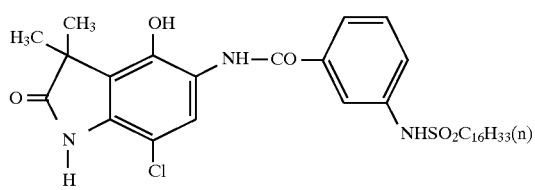
(C-58)
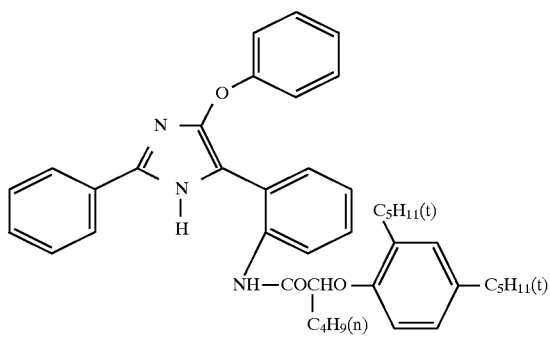

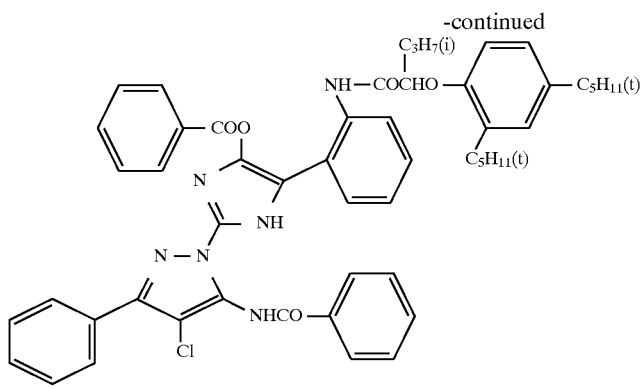
(C-59)
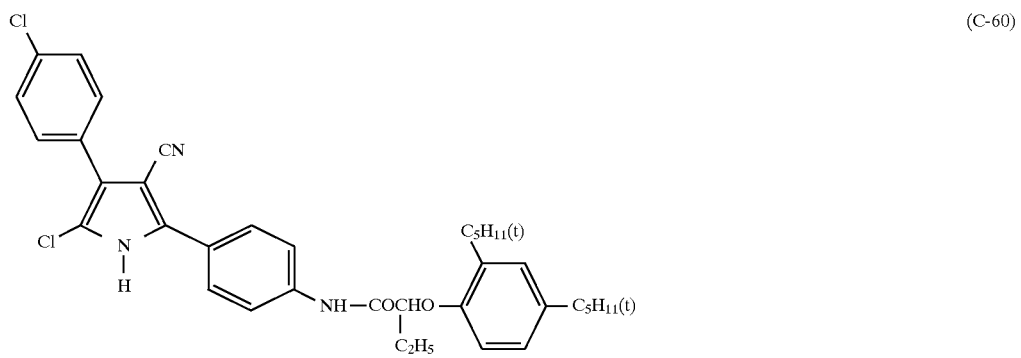
(C-60)
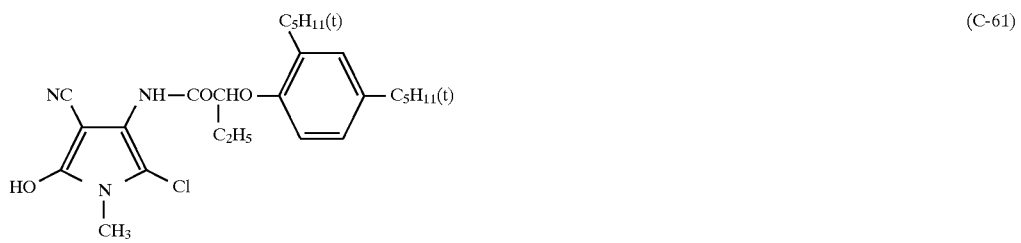
(C-61)
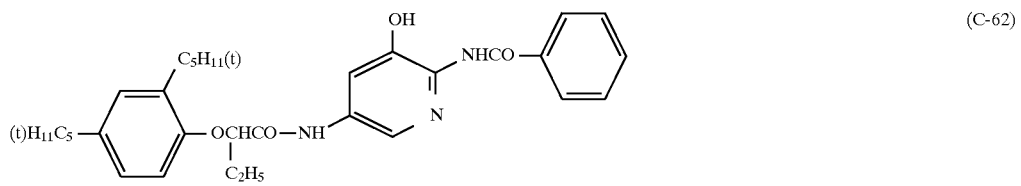
(C-62)
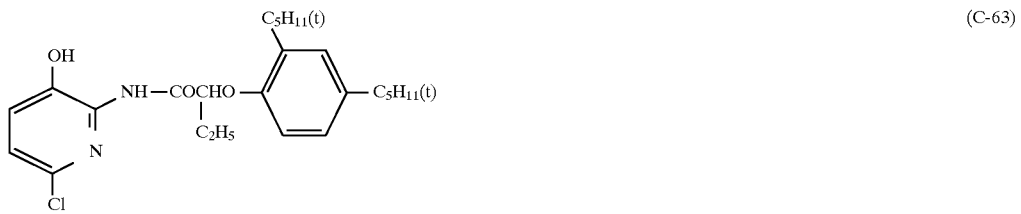
(C-63)
(C-64)

-continued
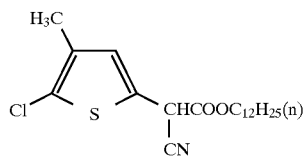
(C-65)
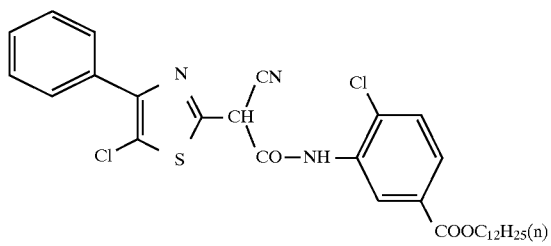
(C-66)
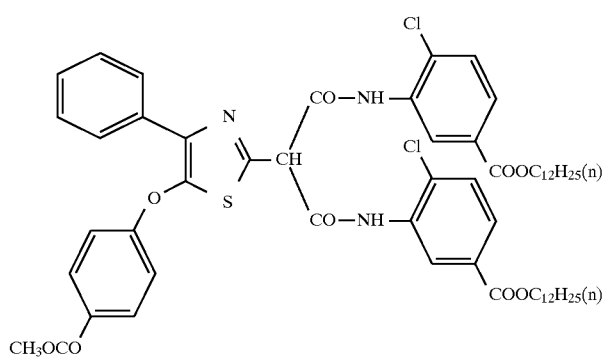
(C-67)
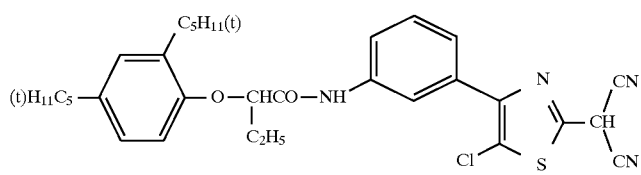
(C-68)
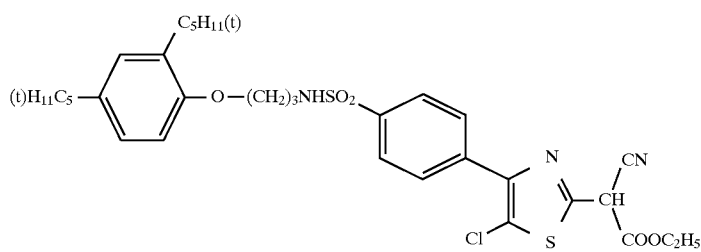
(C-69)
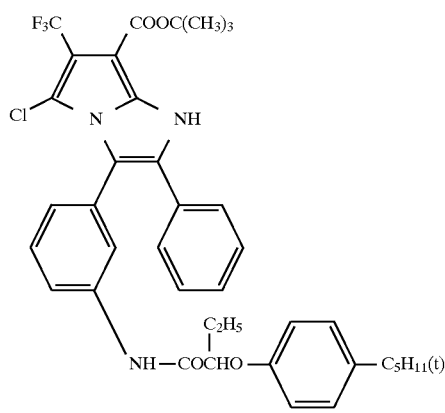
(C-70)

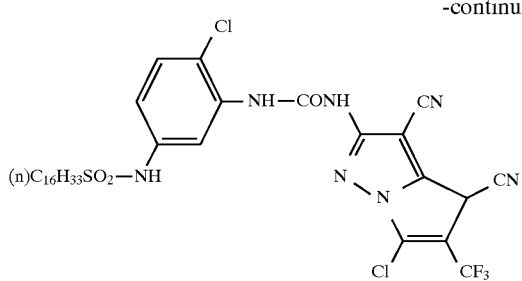
(C-71)
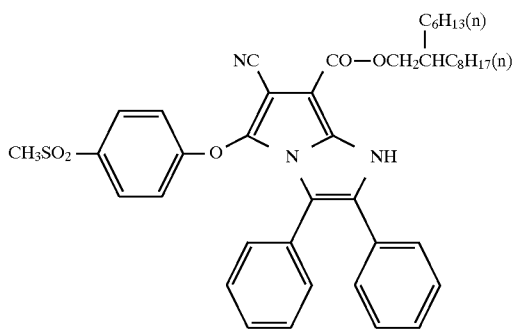
(C-72)
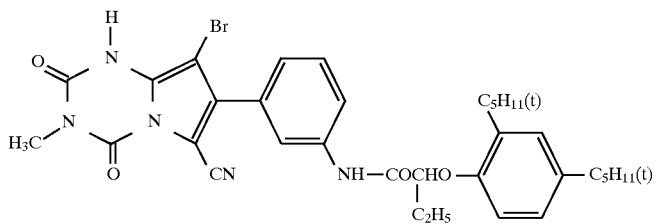
(C-73)
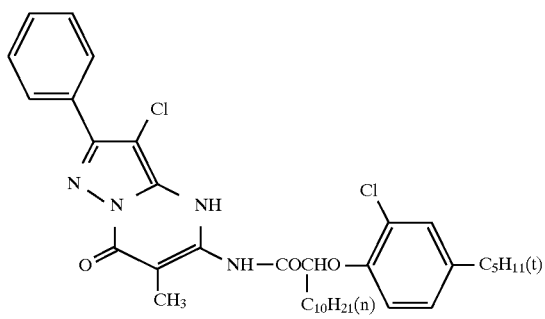
(C-74)
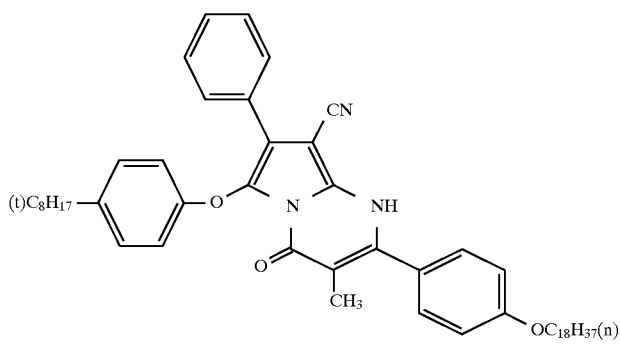
(C-75)
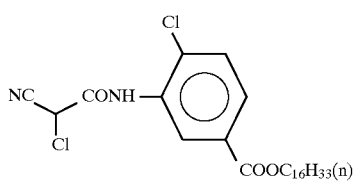
(C-76)

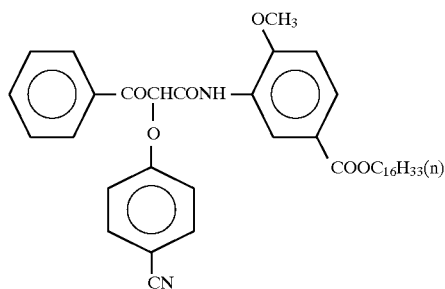
(C-77)
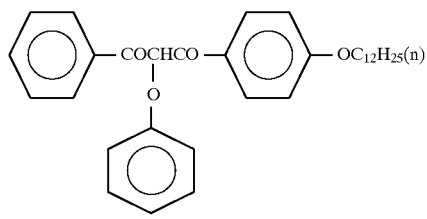
(C-78)
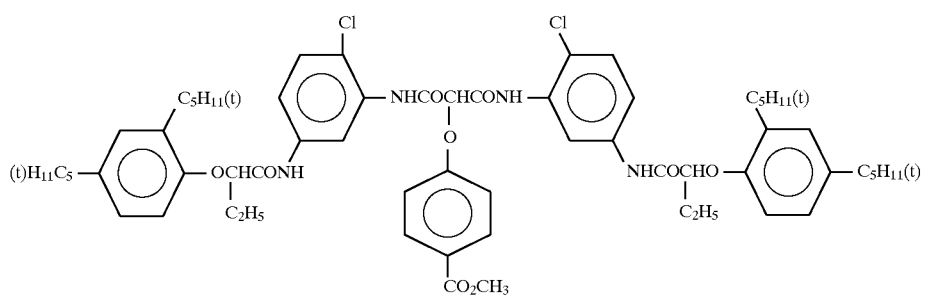
(C-79)
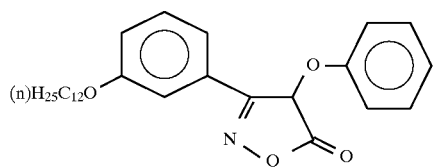
(C-80)
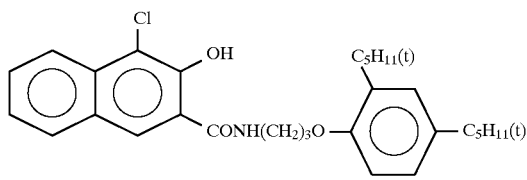
(C-81)
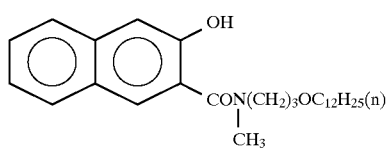
(C-82)
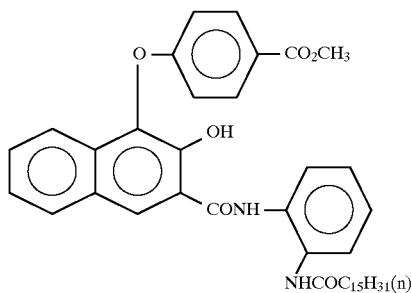
(C-83)

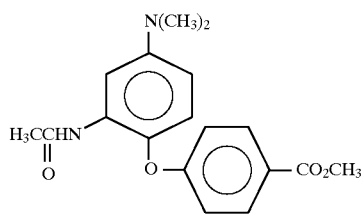
(C-84)

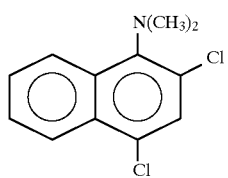
(C-85)

The reaction according to the present invention when the coupling component is phenols, as an example, is shown by the following formula:

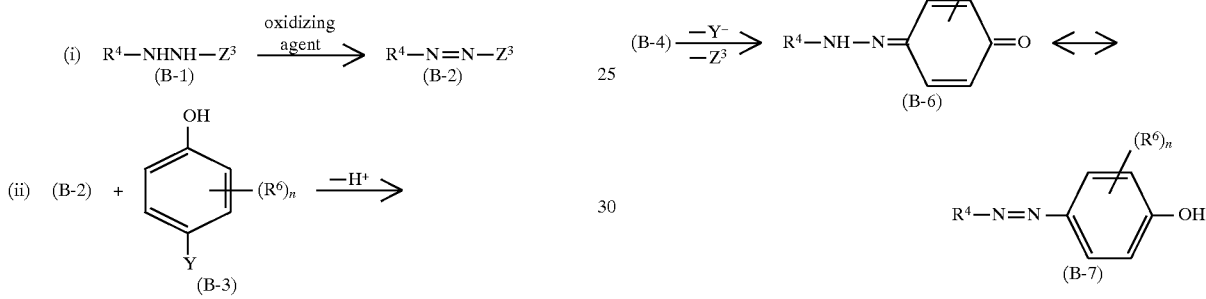

(iii) (When Y represents a hydrogen atom)

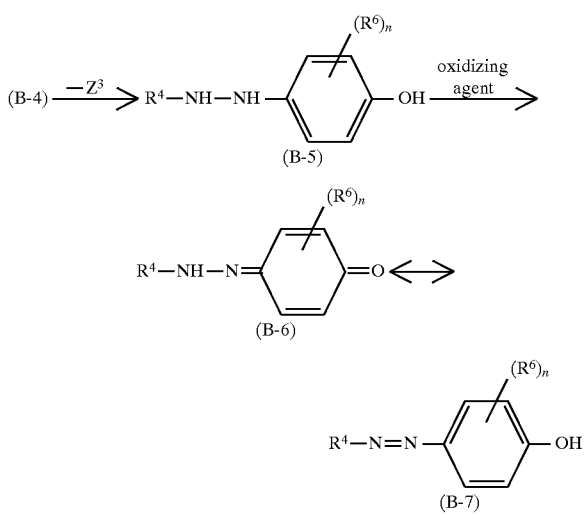

(When Y represents a splitting-off group)

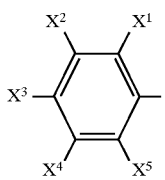

wherein $R^6$ represents a substitute; Y represents a hydrogen atom, or a group that is split-off upon the coupling reaction; n is an integer of from 0 to 4; $Z^3$ represents $Z^1$ or $Z^2$; and $R^4$ represents $R^3$ or the following group:

That is, Compound (B-1) stands for those represented by formula (I), (II), (III), or (IV). At first, these compounds are oxidized by an oxidizing agent, to form Compound (B-2). Further, Compound (B-2) is the same compound as those represented by formula (V), (VI), (VII), or (VIII). Therefore, when a compound represented by formula (V), (VI), (VII), or (VIII) is employed for the reaction, the following reaction scheme is common to them. Compound (B-2) reacts with Coupling component (B-3), to form Compound (B-4).

When Y represents a hydrogen atom, $Z^3$ splits off from Compound (B-4), to form Compound (B-5). This resultant compound is then oxidized, to form Azo dye compound (B-6) or (B-7). Further, when Y is a splitting-off group, the Compound (B-6) or (B-7) can be formed by splitting both $Z^3$ and Y from Compound (B-4). Usually, these azo dye compounds (B-6) and (B-7) can be used in the state of a proton being dissociated.

Further, with respect to the splitting of $Z^3$, by attack of a nucleophilic agent, $Z^3$ is split off in the state that $Z^3$ and the nucleophilic agent are combined with each other, or alternatively a part of the group, such as a proton, is split off from a part of $Z^3$, whereby a compound having a double bond is split off. Taking the compound represented by formula (III), (IV), (VII), or (VIII) as an example, when one of $R^1$ or $R^2$ is a hydrogen atom, it is believed that an isocyanate compound is split off.

The azo dye compound that is produced according to the present invention can be employed as the dissociation product, or alternatively as the non-dissociation product, with the former being preferred. The maximum absorption wavelength of the thus produced azo dye is in the range of from 350 to 750 nm, preferably from 400 to 700 nm. Azo dyes having various hues can be manufactured according to the kind of a compound represented by formula (I), (II), (III), or (IV), or a coupling component, to be used. The pH value at which an azo dye is produced according to the present invention can be changed from low to high, to dissociate the azo dye, whereby the maximum absorption wavelength thereof is lengthened, which results in a coloring or a change of color. Alternatively, the pH value can be changed from high to low, to modify the azo dye to a non-dissociation product, which results in disappearance of color or a change of color.

The azo dye compounds that can be manufactured according to the present invention are represented by, for example, the following formulae:

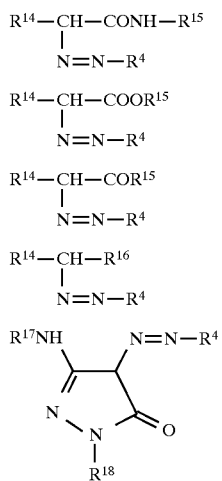

-continued

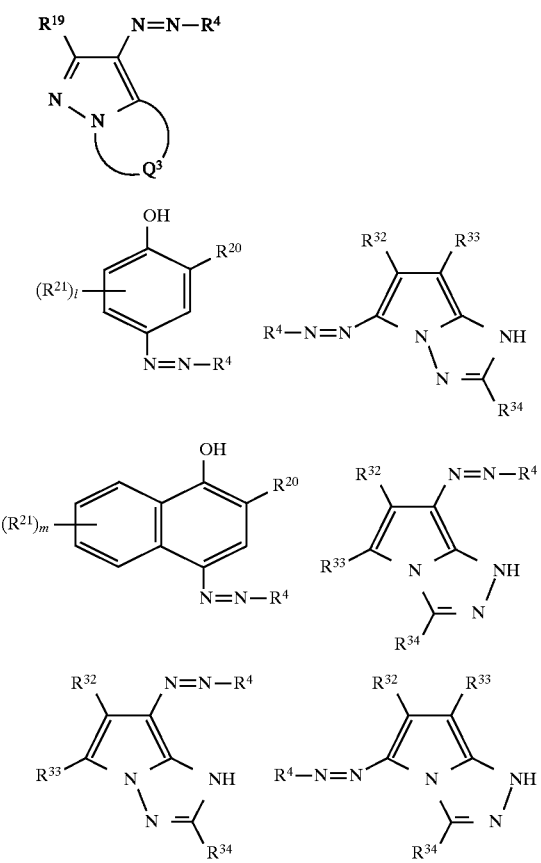

wherein $R^{14}$ to $R^{21}$, $R^{32}$ to $R^{34}$, $Q^3$, l and m each have the same meanings as those described above, and $R^4$ also has the same meaning as described above.

Specific examples of azo dye compounds that are produced by the present invention are illustrated below, however the present invention is not limited to them.

D-1

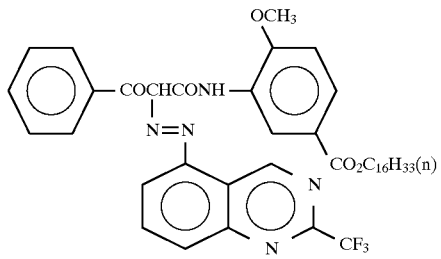

-continued
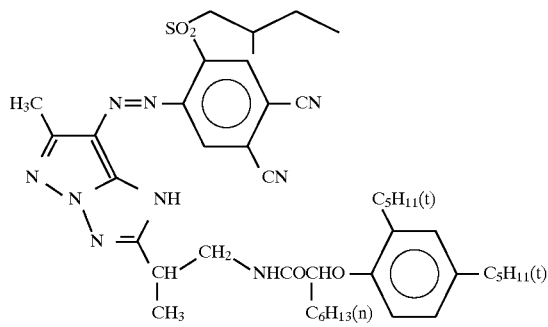
D-2
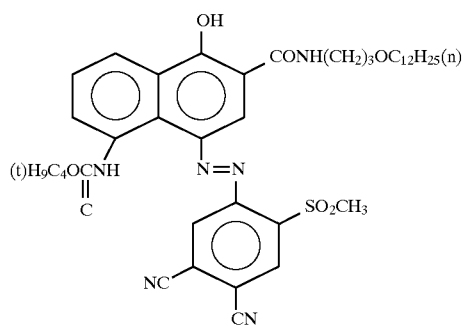
D-3
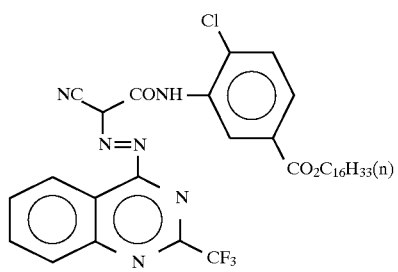
D-4
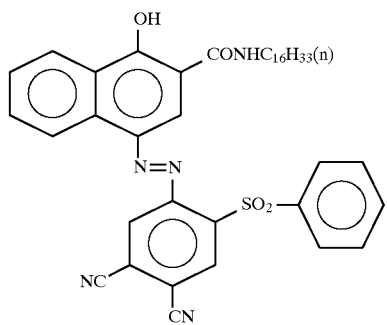
D-5
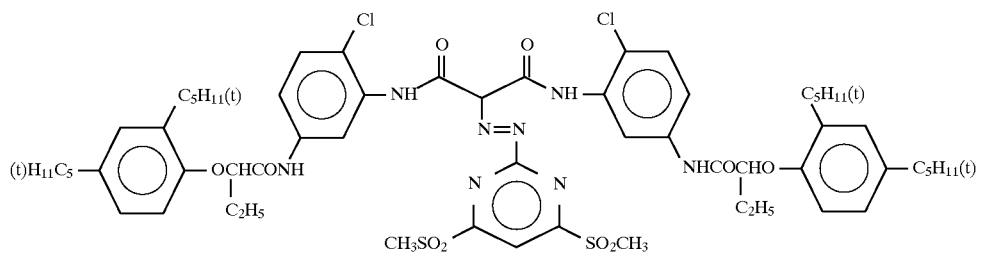
D-6

-continued
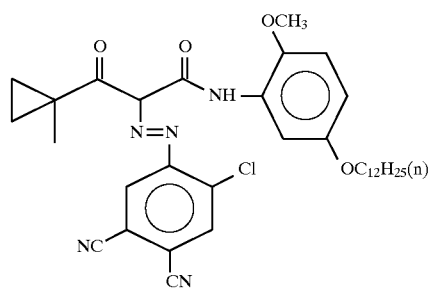
D-7
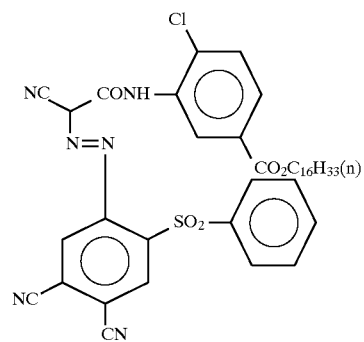
D-8
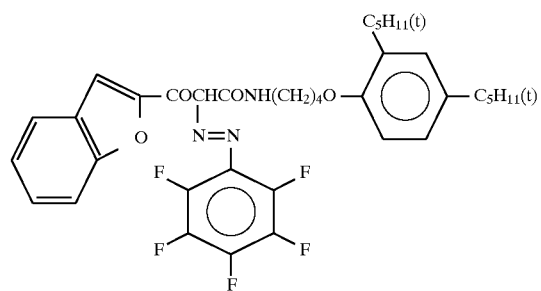
D-9
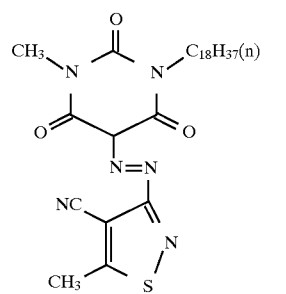
D-10
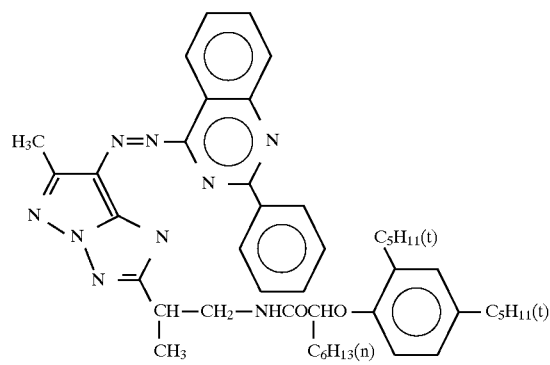
D-11

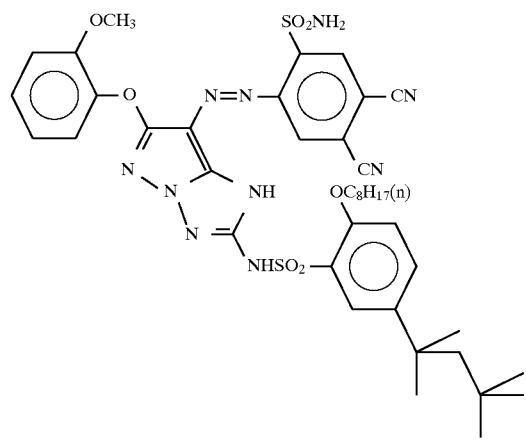
D-12
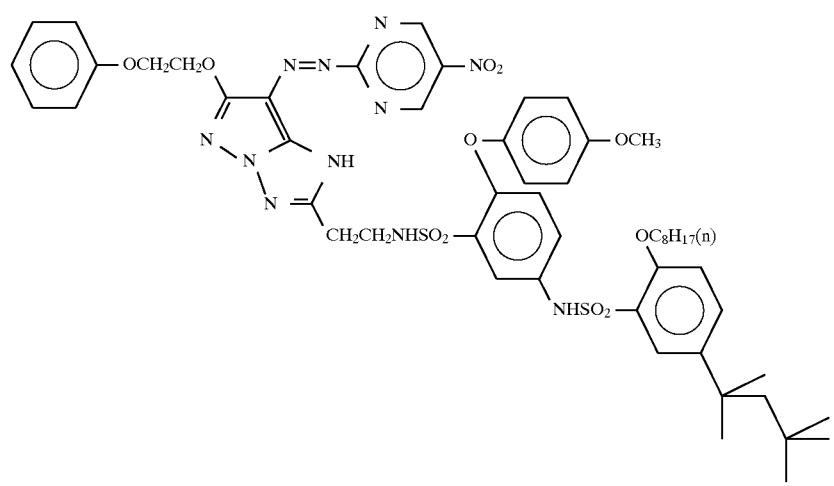
D-13
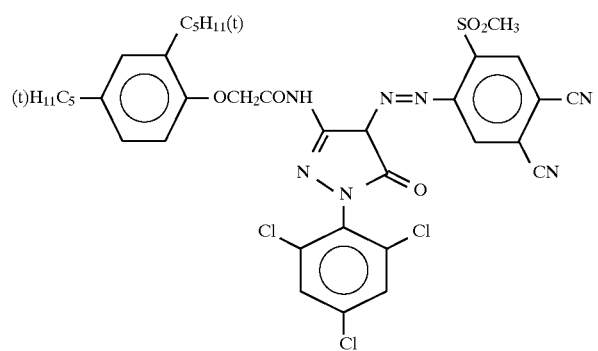
D-14
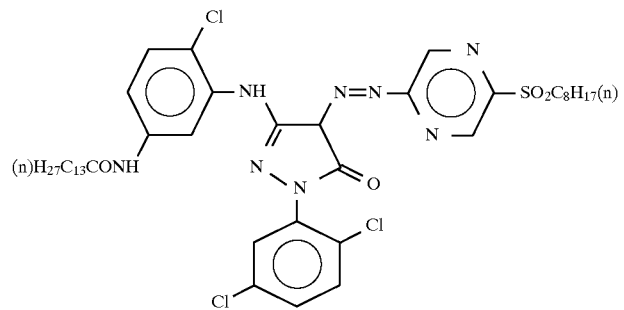
D-15

-continued
D-16
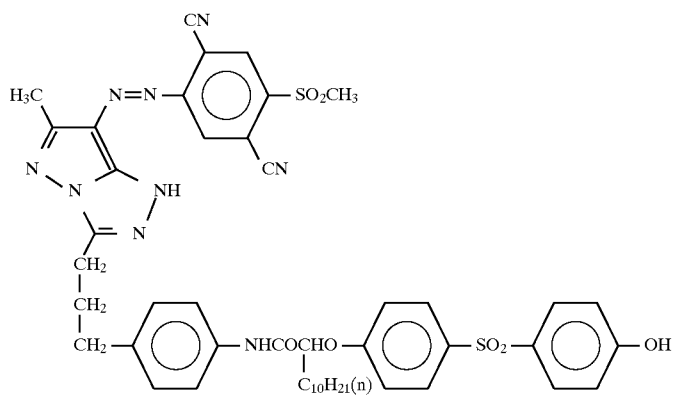
D-17
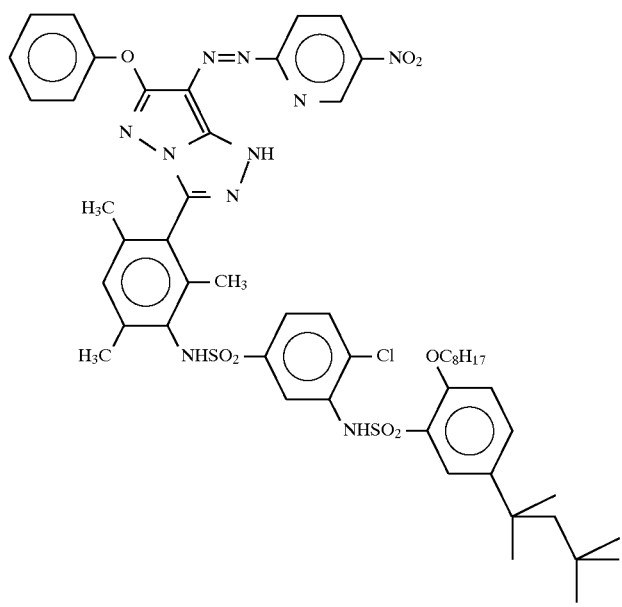
D-18
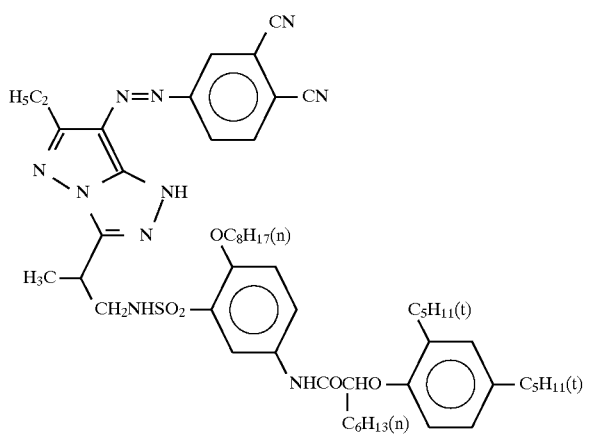

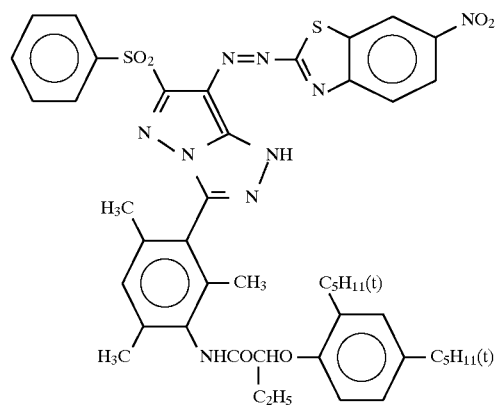
D-19
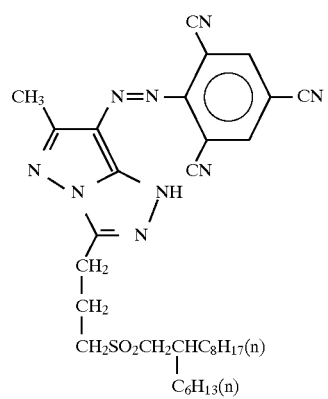
D-20
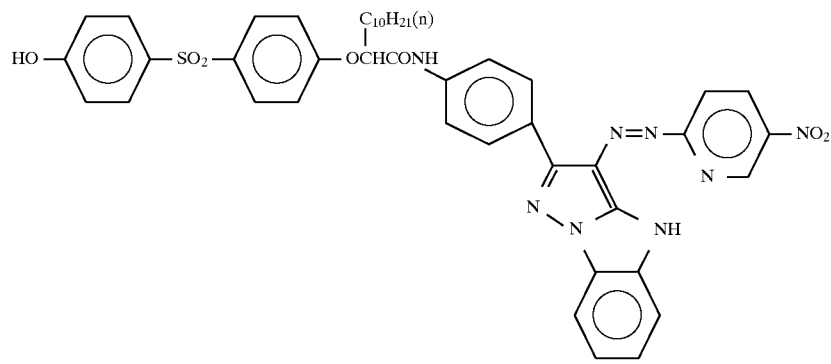
D-21
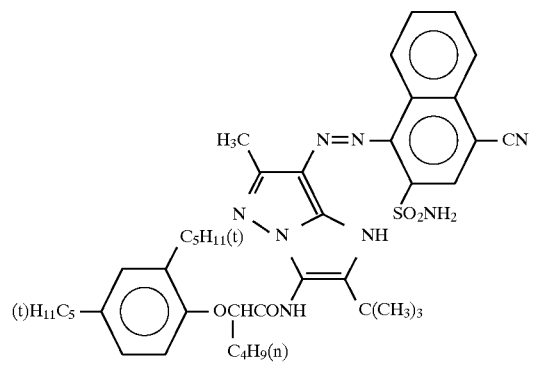
D-22

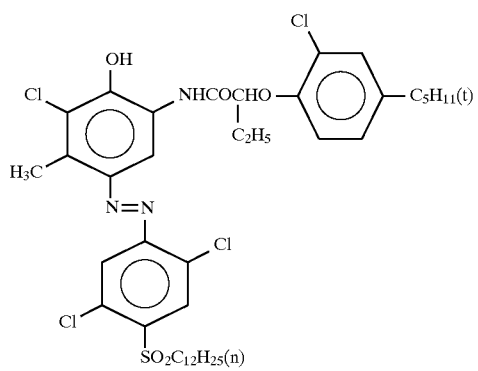
D-23
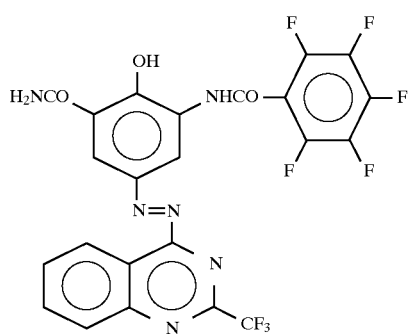
D-24
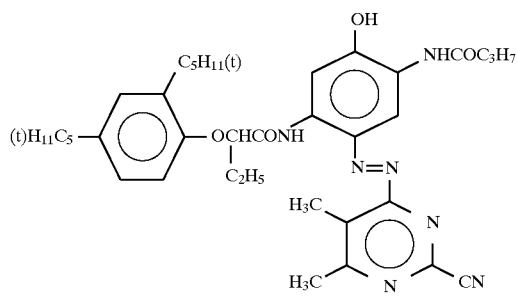
D-25
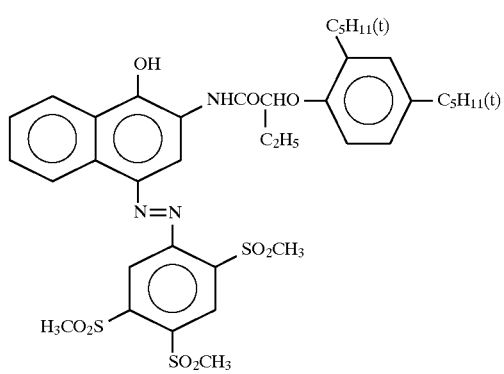
D-26

-continued
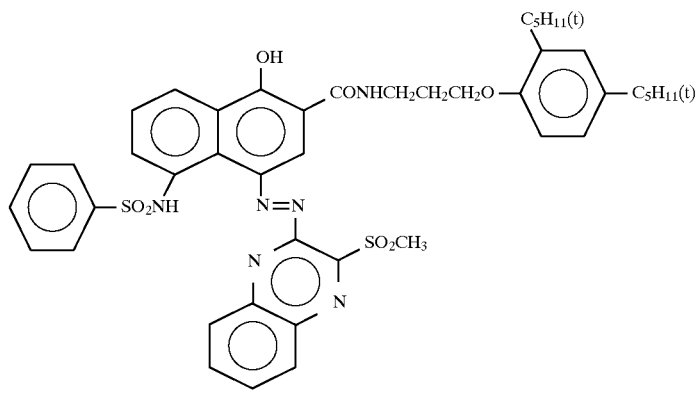
D-27
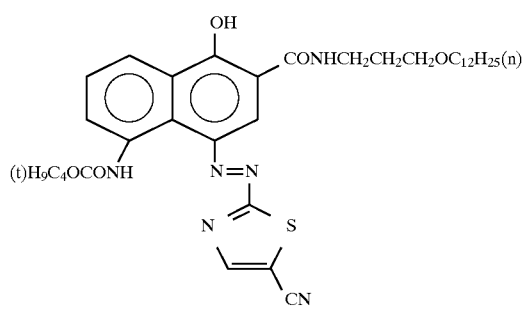
D-28
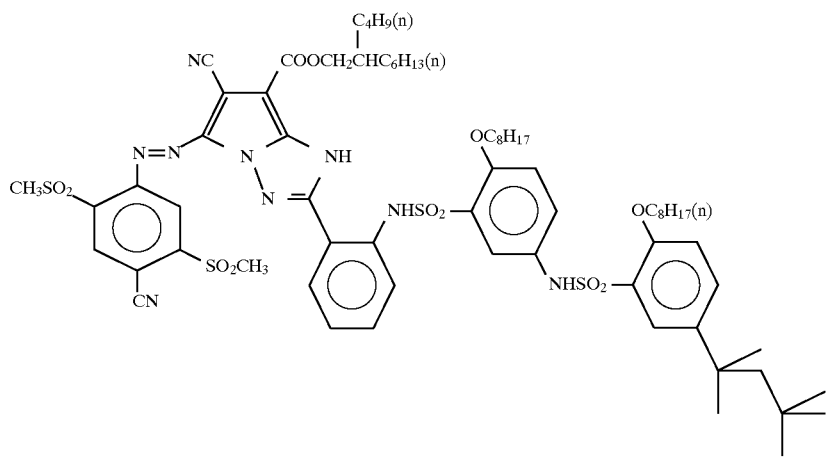
D-29
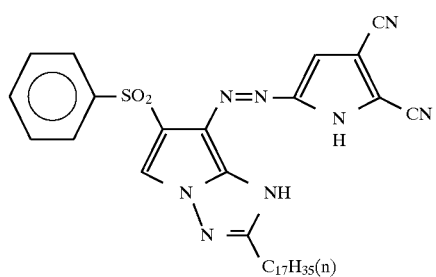
D-30

-continued
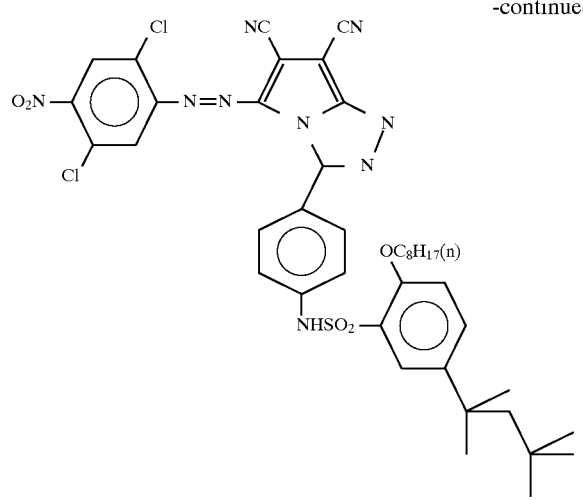
D-31
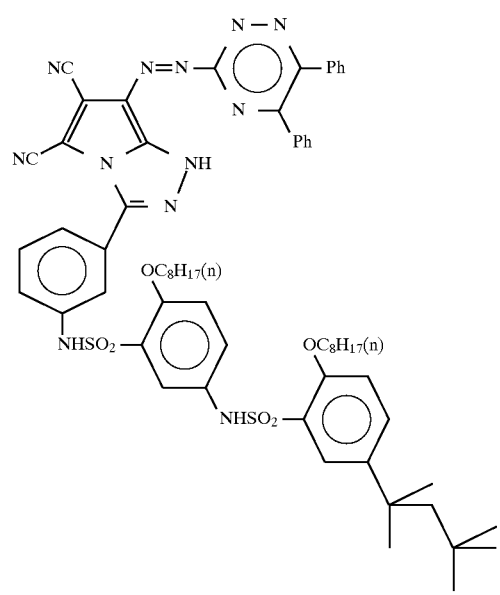
D-32
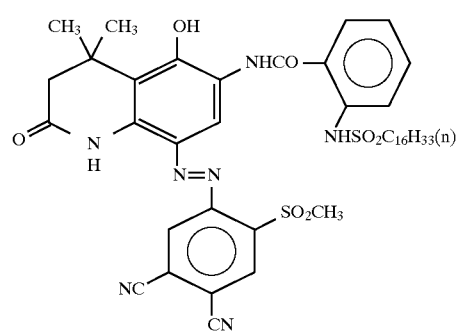
D-33
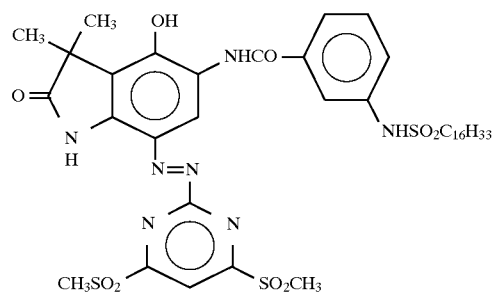
D-34

-continued
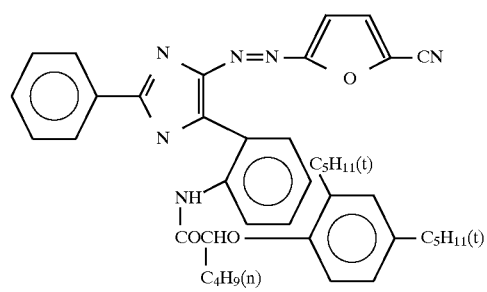
D-35
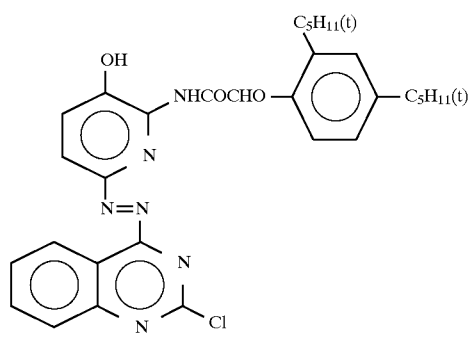
D-36
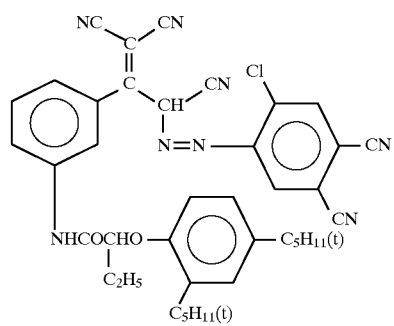
D-37
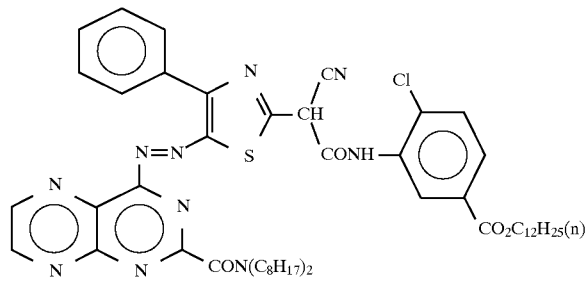
D-38
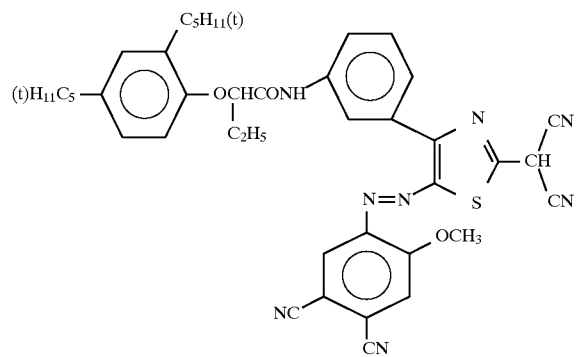
D-39

-continued

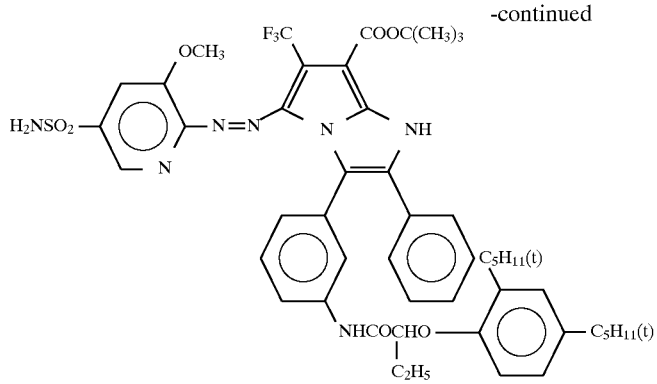

D-40

In the method of the present invention, reactants may be reacted in the absence of any solvent, or alternatively they may be dissolved or dispersed in a suitable solvent to react them. Examples of the solvent for use in the reaction according to the present invention include water, alcoholic solvents (e.g. methanol, isopropanol), basic solvents (e.g. dichloromethylene), aromatic solvents (e.g. benzene, chlorobenzene, toluene), amide solvents (e.g. N,N-dimethylformamide, N,N-dimethylacetamide, N-methylpyrrolidone), nitrile solvents (e.g. acetonitrile, propionitrile), ether solvents (e.g. tetrahydrofuran, ethyleneglycol diethyl ether), sulfonic solvents (e.g. dimethylsulfone, sulfolane), phosphoric acid amide solvents (e.g. hexamethylphosphoric triamide), hydrocarbon solvents (e.g. cyclohexane, normal hexane), and ester solvents (e.g. ethyl acetate).

These solvents may be used singly, or in combination of two or more kinds thereof.

The amount of the solvent to be used is generally from 0.1 to 1000 weight parts, preferably from 0.2 to 20 weight parts, per weight part of the compound represented by formula (I) to (VIII).

In the method of the present invention, preferably a base can be used. Examples of the base for use in the present invention include hydroxide compounds (e.g. sodium hydroxide, potassium hydroxide, tetrabutylammonium hydroxide), carbonic acid compounds (e.g. sodium carbonate, potassium carbonate, tetrabutylammonium carbonate), amines (e.g. ammonia, triethylamine, N-ethyldiisopropylamine), anilines (e.g. diethylaniline), aromatic heterocyclic compounds (e.g. pyridine, imidazole), guanidines (e.g. tetramethylguanidine), hydrogen carbonic acid compounds (e.g. sodium hydrogen carbonate), nitrogen-containing heterocyclic compounds (e.g. 1,8-diazabicyclo[5,4,0]-7-undecene), acetic acid compounds (e.g. sodium acetate, potassium acetate), and metal salts of an organic compound (e.g. sodium methoxide).

These bases may be used singly, or in combination of two or more kinds thereof.

The amount of the base to be used is generally from 0.01 to 100 mol, preferably from 0.05 to 50 mol, and more preferably from 0.1 to 10 mol, per mol of the compound represented by formula (I) to (VIII).

The molar ratio of the compound represented by formula (I) to (VIII) to the coupling component for use in the reaction according to the present invention is in the range of from (100:1) to (1:100), preferably from (10:1) to (1:10). Further, the molar ratio of the compound represented by formula (I) to (IV), to the oxidizing agent to be used is in the range of from (10:1) to (1:10000), preferably from (5:1) to (1:1000), and more preferably from (1:1) to (1:100).

The reaction according to the present invention is carried out at a temperature of from −80° C. to 200° C., preferably from −20° C. to 150° C., and more preferably from 0° C. to 100° C. The reaction time according to the present invention is from 10 sec to 50 hrs, preferably from 1 min to 10 hrs, and more preferably from 5 min to 5 hrs.

As a practical embodiment of the present invention, the above-described reaction is carried out in a reaction vessel that is made of such a material as a glass, a metal, or a resin, whereby an azo dye can be prepared.

Further, an azo dye compound may be produced by a method of the present invention, which method comprises the steps of incorporating the particular hydrazine compound represented by the above-described formula and a coupling component in a hydrophilic colloid layer of a silver halide photographic light-sensitive material, and subjecting them to a reaction, in the presence of the silver halide as an oxidizing agent, at the time of a development processing. Alternatively, an azo compound may be produced by another method of the present invention, which method comprises the steps of incorporating one of the above-described hydrazine compound and the coupling component in a silver halide photographic light-sensitive material, while incorporating another one of them in a processing solution, and then subjecting them to a reaction, in the presence of the silver halide as an oxidizing agent, at the time of a development processing.

The method of the present invention provides the excellent effect that azo dye compounds can be produced in a high yield by the use of hydrazines or azo compounds, both of which are safe raw materials, without the use of a diazonium salt compound that involves a risk of explosion.

Further, the method of the present invention also provides the excellent effect that azo dye compounds can be produced in a high yield, even by the use of coupling components whose coupling position is substituted with various kinds of substituents, such as a hydrogen atom and a phenoxy group.

EXAMPLES

Some specific examples of the present invention are described below, however the present invention is not limited to them.

Example 1

Synthesis (1) of Azo Dye Compound (D-1)

Azo dye compound (D-1)

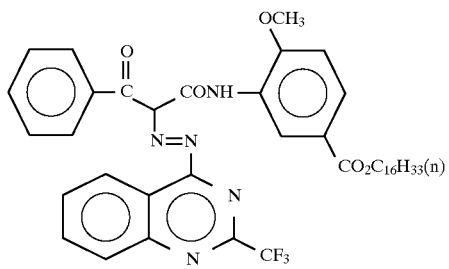

The reaction was carried out according to the following reaction scheme:

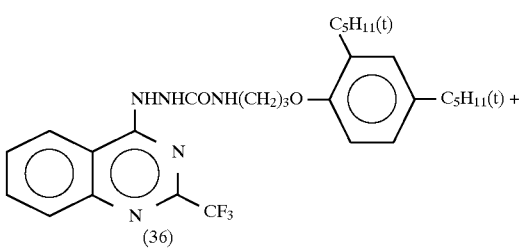

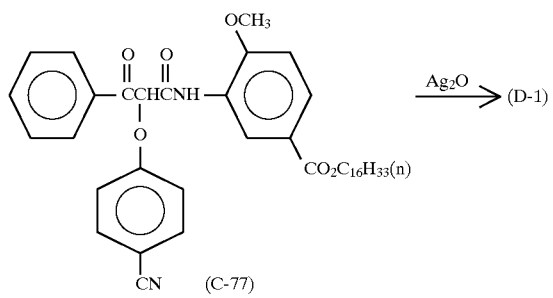

In 300 ml of acetonitrile was dissolved 5.46 g (10 millimol) of Compound (36), 6.55 g (10 millimol) of Compound (C-77), and 1.55 g (12 millimol) of N-ethyldiisopropylamine, and to this solution was added 4.63 g (20 millimol) of silver oxide at 50° C., and they were allowed to react together at 50° C. for 20 min. The resultant reaction liquid was filtered through Celite, and then water was added to the filtrate. An organic layer was extracted from the filtrate with ethyl acetate, and washed with dilute hydrochloric acid, followed by a washing with brine, and then the layer was dried with magnesium sulfate anhydride. After filtration, a solvent was removed by distillation from the filtrate under reduced pressure, and then the resultant residue was subjected to silica gel column chromatography, for purification. This product was recrystallized from acetonitrile, and 6.61 g (8.76 millimol) of Compound (D-1) was obtained, as a yellow solid. Yield: 86.7% $\lambda_{max}$=445 nm (in DMF)

Example 2

Synthesis (2) of Azo Dye Compound (D-1)

The reaction was carried out according to the following reaction scheme:

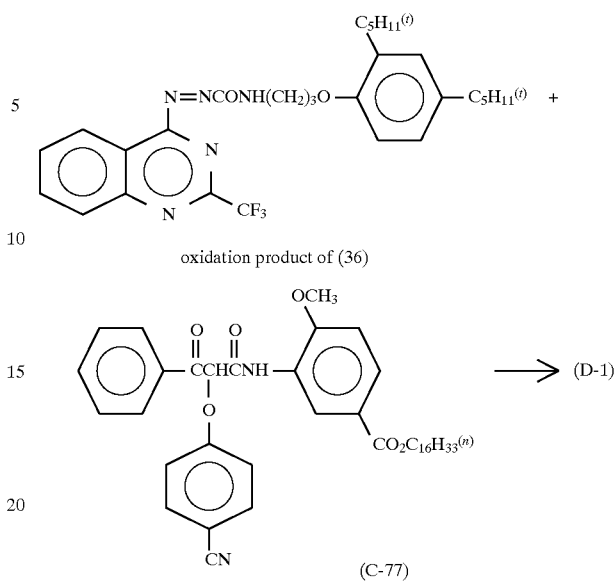

A mixture of 5.44 g (10 millimol) of the oxidation product of Compound (36) and 6.55 g (10 millimol) of Compound (C-77) were dissolved by heat at 50° C., and to the solution was added 1.55 g (12 millimol) of N-ethyldiisopropylamine. The resultant mixture was subjected to a reaction at 50° C. for 20 min. The reaction liquid was cooled on an ice bath, and then the precipitated Compound (D-1) was filtered, and it was washed with acetonitrile, followed by drying. As a result, 7.29 g (9.57 millimol) of Compound (D-1) was obtained. Yield: 95.7%

Example 3

Synthesis (1) of Azo Dye Compound (D-2)

Azo Dye Compound (2)

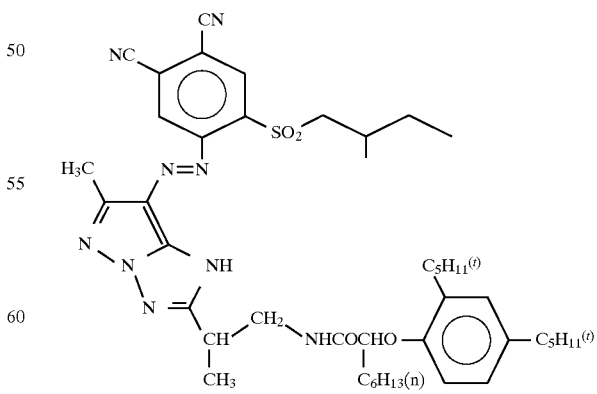

The reaction was carried out according to the following reaction scheme:

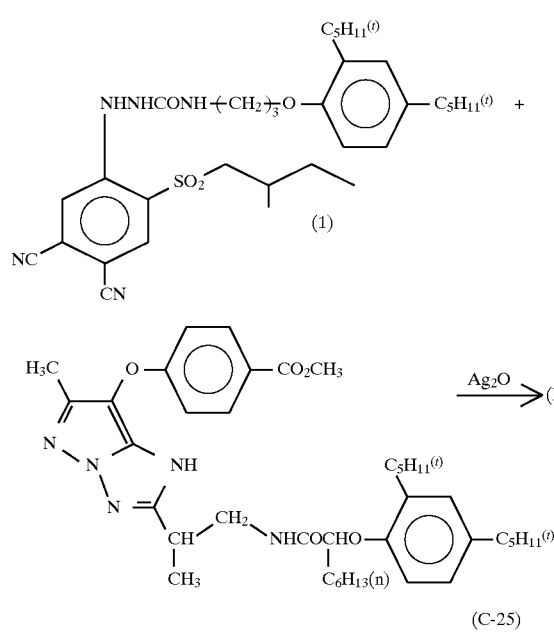

Similarly to Example 1, the synthesis was carried out by using 6.10 g (10 millimol) of Compound (1), 6.88 g (10 millimol) of Compound (C-25), 1.55 g (12 millimol) of N-ethyldiisopropylamine, and 4.63 g (20 millimol) of silver oxide, to obtain 6.99 g (8.46 millimol) of Azo Dye Compound (D-2), as an orange solid. Yield: 84.6% $\lambda_{max}$=515 nm (in DMF)

Example 4

Synthesis (2) of Azo Dye Compound (D-2)

The reaction was carried out according to the following reaction scheme:

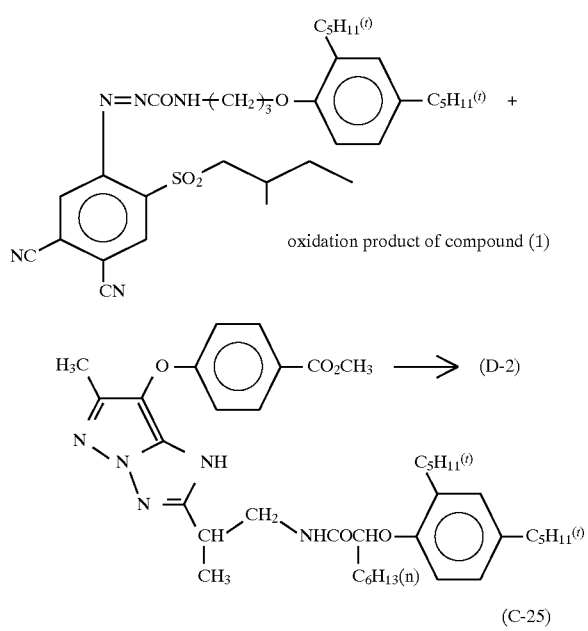

Similarly to Example 2, the synthesis was carried out by using 6.08 g (10 millimol) of the oxidation product of Compound (1), 6.88 g (10 millimol) of Compound (C-25), and 1.55 g (12 millimol) of N-ethyldiisopropylamine, to obtain 7.74 g (9.37 millimol) of Azo Dye Compound (D-2). Yield: 93.7%

Example 5

Synthesis (1) of Azo Dye Compound (D-3)
Azo Dye Compound (D-3)

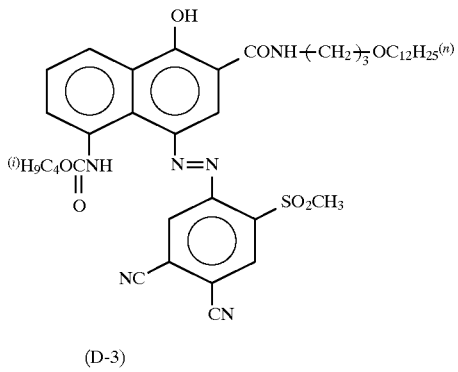

(D-3)

The reaction was carried out according to the following scheme:

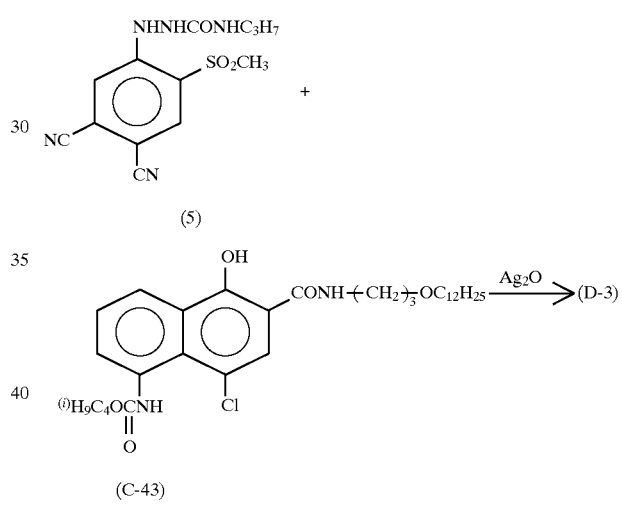

In 100 ml of ethyl acetate were dissolved 3.21 g (10 millimol) of Compound (5) and 5.63 g (10 millimol) of Compound (C-43), and then a solution of 4.15 g (30 millimol) of potassium carbonate in 100 ml of water was added to the solution. To this solution was added 4.63 g (20 millimol) of silver oxide, and the mixture was subjected to a reaction at room temperature for 3 hrs. The resultant reaction liquid was filtered through Celite, followed by separation of layers. The organic layer was washed with dilute hydrogen chloride, and then with brine, followed by drying over magnesium sulfate anhydride. After filtration, a solvent was removed from the filtrate by distillation under reduced pressure. The resultant residue was subjected to silica gel chromatography, for purification. The obtained product was crystallized from a mixed solvent of hexane and ethyl acetate, and 6.20 g (8.15 millimol) of Compound (D-3) was obtained as a red brown solid. Yield: 81.5% $\lambda_{max}$=633 nm (in DMF)

Example 6

Synthesis (2) of Azo Dye Compound (D-3)

The reaction was carried out according to the following scheme:

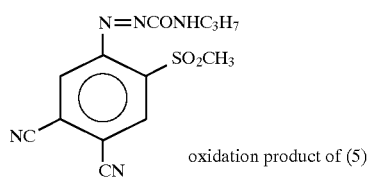

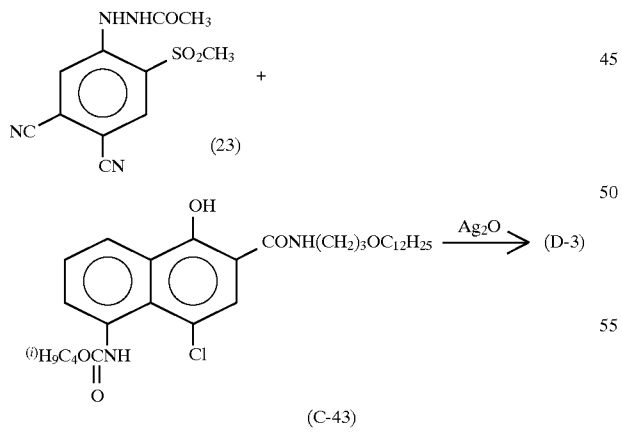

In 100 ml of ethyl acetate were dissolved 3.19 g (10 millimol) of the oxidation product of Compound (5) and 5.63 g (10 millimol) of Compound (C-43), and then a solution of 4.15 g (30 millimol) of potassium carbonate in 100 ml of water was added to the solution. The mixture was subjected to a reaction at room temperature for 3 hrs. The resultant reaction solution was followed by separation of layers. The organic layer was washed with dilute hydrogen chloride, and then with brine, followed by drying over magnesium sulfate anhydride. After filtration, a solvent was removed from the filtrate by distillation under reduced pressure. The resultant residue was subjected to silica gel chromatography, for purification. The obtained product was crystallized from a mixed solvent of hexane and ethyl acetate, and 6.56 g (8.62 millimol) of Compound (D-3) was obtained. Yield: 86.2%

Example 7

Synthesis (3) of Azo Dye Compound (D-3)

The reaction was carried out according to the following scheme:

Similarly to Example 5, the synthesis was carried out by using 2.78 g (10 millimol) of Compound (23), 5.36 g (10 millimol) of Compound (C-43), 4.15 g (30 millimol) of potassium carbonate, and 4.63 g of silver oxide, to obtain 4.95 g (6.51 millimol) of Compound (D-3). Yield: 65.1%

Example 8

Synthesis (4) of Azo Dye Compound (D-3)

The reaction was carried out according to the following scheme:

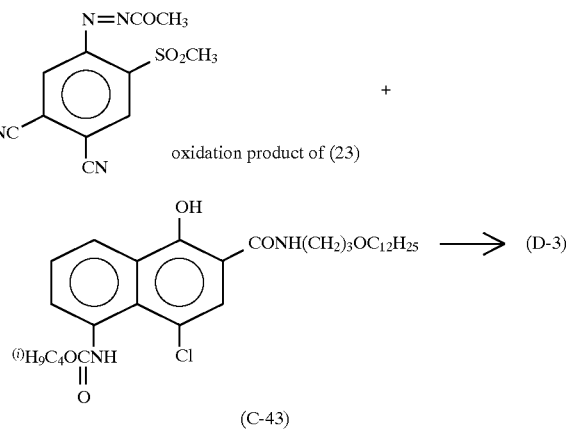

Similarly to Example 6, the synthesis was carried out by using 2.76 g of the oxidation product of Compound (23), 5.63 g (10 millimol) of Compound (C-43), and 4.15 g (30 millimol) of potassium carbonate, to obtain 5.50 g (7.23 millimol) of Compound (D-3). Yield: 72.3%

Example 9

Synthesis (1) of Azo Dye Compound (D-4)

Azo Dye Compound (D-4)

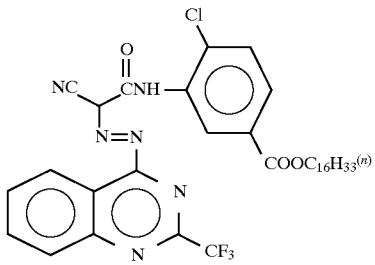

The reaction was carried out according to the following reaction scheme:

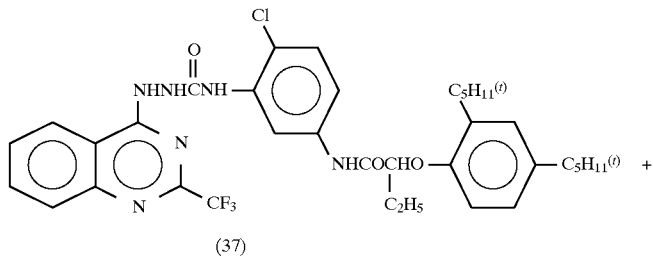

(37)

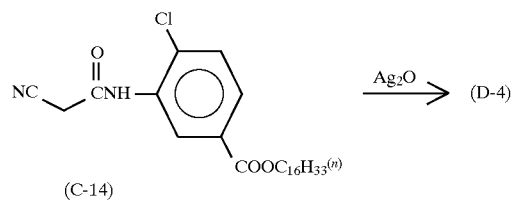

(C-14)

Similarly to Example 1, the synthesis was carried out by using 6.99 g (10 millimol) of Compound (37), 4.63 g (10 millimol) of Compound (C-14), 1.55 g (12 millimol) of N-ethyldiisopropylamine, and 9.26 g (40 millimol) of silver oxide, to obtain 6.36 g (8.42 millimol) of Azo Dye Compound (D-4), as a yellow solid. Yield: 84.2% $\lambda_{max}$=447 nm (in DMF)

Example 10

Synthesis (2) of Azo Dye Compound (D-4)

The reaction was carried out according to the following reaction scheme:

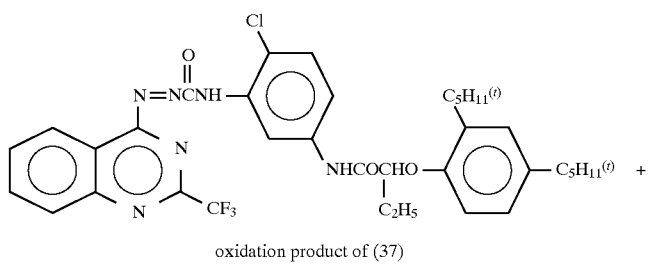

oxidation product of (37)

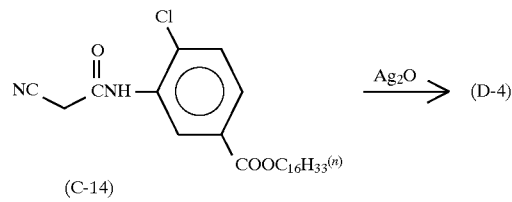

(C-14)

Similarly to Example 1, the synthesis was carried out by using 6.97 g (10 millimol) of the oxidation product of Compound (37), 4.63 g (10 millimol) of Compound (C-14), 1.55 g (12 millimol) of N-ethyldiisopropylamine, and 4.63 g (20 millimol) of silver oxide, to obtain 6.83 g (9.03 millimol) of Azo Dye Compound (D-4). Yield: 90.3%

Comparative Example 1

The same operation as in Example 1 was repeated, except for employing the following compound (Ex-1) described in EP 0545491A1 and Compound (C-77).

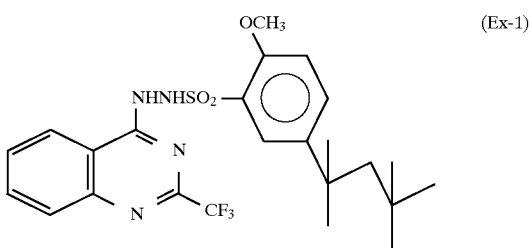

However, only an extremely small amount of Dye (D-1) was produced, while a large amount of other compounds were produced as by-products. As a result, it was difficult to calculate the yield by means of isolation of the dye.

Comparative Example 2

The same operations as in Examples 3 and 5 were repeated, except for employing the compound (Ex-1) and Compound (C-25), and the compound (Ex-1) and Compound (C-43), respectively. However, the amount of each of the thus obtained dyes was extremely small.

Comparative Example 3

Similarly to Example 9, the synthesis was carried out by using compound (Ex-1) and Compound (C-14), to obtain 4.80 g (6.35 millimol) of Azo Dye Compound (D-4). Yield: 63.5%

Having described our invention as related to the present embodiments, it is our intention that the invention not be limited by any of the details of the description, unless otherwise specified, but rather be construed broadly within its spirit and scope as set out in the accompanying claims.

What we claim is:

1. A method for producing azo dye compounds, which comprises reacting a compound represented by formula (III) or (IV) with a coupling component, in the presence of an oxidizing agent:

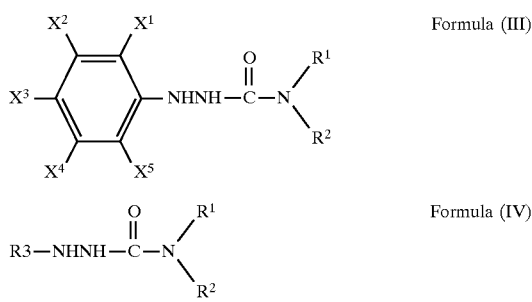

wherein $X^1$, $X^2$, $X^3$, $X^4$, and $X^5$ each represent a hydrogen atom or a substituent, provided that the sum of the Hammett substituent constant σp values of $X^1$, $X^3$, and $X^5$ and the Hammett substituent constant σm values of $X^2$ and $X^4$ is 0.80 or more but 3.80 or below; $R^1$ and $R^2$ each represent a hydrogen atom or a substituent, provided that at least one of $R^1$ or $R^2$ is a hydrogen atom; and $R^3$ represents a heterocyclic group.

2. The method for producing azo dye compounds as claimed in claim 1, wherein $R^1$ and $R^2$ in formulae (III) and (IV) each represent a hydrogen atom, a substituted or unsubstituted alkyl group having 1 to 50 carbon atoms, a substituted or unsubstituted aryl group having 6 to 50 carbon atoms, or a substituted or unsubstituted heterocyclic group having 1 to 50 carbon atoms.

3. The method for producing azo dye compounds as claimed in claim 1, wherein $R^3$ in formula (IV) represents a saturated or unsaturated 3-membered to 12-membered monocyclic or condensed heterocyclic group having 1 to 50 carbon atoms, containing at least one hetero atom selected from the group consisting of a nitrogen atom, an oxygen atom and a sulfur atom, and having one or more electron-attracting groups.

4. The method for producing azo dye compounds as claimed in claim 1, wherein the coupling component is a photographic coupler.

5. The method for producing azo dye compounds as claimed in claim 1, wherein the molar ratio of the compound represented by formula (III) or (IV) to the coupling component is in the range of from (100:1) to (1:100).

6. The method for producing azo dye compounds as claimed in claim 1, wherein the oxidizing agent is selected from the group consisting of an inorganic compound, an organic compound, and oxygen in air.

7. The method for producing azo dye compounds as claimed in claim 1, wherein the molar ratio of the compound represented by formula (III) or (IV) to the oxidizing agent is in the range of from (10:1) to (1:10000).

8. The method for producing azo dye compounds as claimed in claim 1, wherein the reaction is carried out in the presence of a base.

9. The method for producing azo dye compounds as claimed in claim 1, which comprises the steps of incorporating the compound represented by formula (III) or (IV) and the coupling component in a hydrophilic colloid layer of a silver halide photographic light-sensitive material, and reacting the compound of formula (I) or (II) and the coupling component, in the presence of the silver halide as the oxidizing agent, at the time of development processing.

10. The method for producing azo dye compounds as claimed in claim 1, which comprises the steps of incorporating one of the compound represented by formula (III) or (IV) and the coupling component in a silver halide photographic light-sensitive material, incorporating another one of the compound and the coupling component in a processing solution, and then reacting the compound of formula (III) or (IV) and the coupling component, in the presence of the silver halide as the oxidizing agent, at the time of development processing.

11. A method for producing azo dye compounds, which comprises reacting a compound represented by formula (VII) or (VIII) with a coupling component:

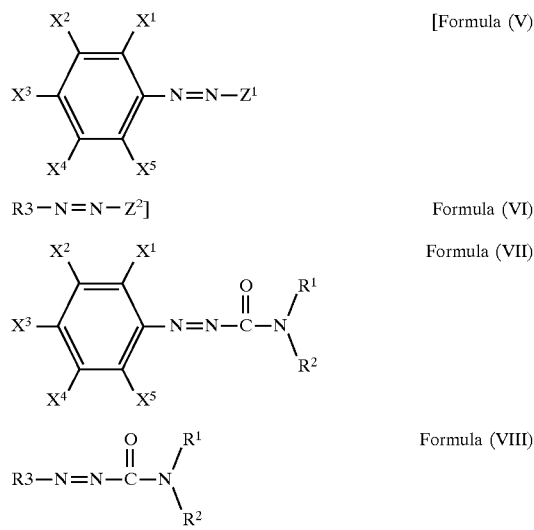

wherein $X^1$, $X^2$, $X^3$, $X^4$, and $X^5$ each represent a hydrogen atom or a substituent, provided that the sum of the Hammett substituent constant σp values of $X^1$, $X^3$, and $X^5$ and the Hammett substituent constant σm values of $X^2$ and $X^4$ is 0.80 or more but 3.80 or below; $R^1$ and $R^2$ each represent a hydrogen atom or a substituent, provided that at least one of $R^1$ or $R^2$ is a hydrogen atom; and $R^3$ represents a heterocyclic group.

12. The method for producing azo dye compounds as claimed in claim 11, wherein $R^1$ and $R^2$ in formulae (VII) and (VIII) each represent a hydrogen atom, a substituted or unsubstituted alkyl group having 1 to 50 carbon atoms, a substituted or unsubstituted aryl group having 6 to 50 carbon atoms, or a substituted or unsubstituted heterocyclic group having 1 to 50 carbon atoms.

13. The method for producing azo dye compounds as claimed in claim 11, wherein $R^3$ in formula (VIII) represents a saturated or unsaturated 3-membered to 12-membered monocyclic or condensed heterocyclic group having 1 to 50 carbon atoms, containing at least one hetero atom selected from the group consisting of a nitrogen atom, an oxygen atom and a sulfur atom, and having one or more electron-attracting groups.

14. The method for producing azo dye compounds as claimed in claim 11, wherein the coupling component is a photographic coupler.

15. The method for producing azo dye compounds as claimed in claim 11, wherein the molar ratio of the compound represented by formula (VII) or (VIII) to the coupling component is in the range of from (100:1) to (1:100).

16. The method for producing azo dye compounds as claimed in claim 11, wherein the reaction is carried out in the presence of a base.

* * * * *